(12) United States Patent
Arbilla et al.

(10) Patent No.: US 7,844,582 B1
(45) Date of Patent: Nov. 30, 2010

(54) SYSTEM AND METHOD FOR INVOLVING USERS IN OBJECT MANAGEMENT

(75) Inventors: Laura Arbilla, Austin, TX (US); Jeff G. Bone, Austin, TX (US); Brett A. Funderburg, Austin, TX (US); Keith Zoellner, Austin, TX (US)

(73) Assignee: Stored IQ, Austin, TX (US)

( * ) Notice: Subject to any disclaimer, the term of this patent is extended or adjusted under 35 U.S.C. 154(b) by 131 days.

(21) Appl. No.: 11/262,411

(22) Filed: Oct. 28, 2005

Related U.S. Application Data

(60) Provisional application No. 60/622,955, filed on Oct. 28, 2004, provisional application No. 60/622,820, filed on Oct. 28, 2004, provisional application No. 60/622,733, filed on Oct. 28, 2004, provisional application No. 60/622,951, filed on Oct. 28, 2004, provisional application No. 60/623,027, filed on Oct. 28, 2004, provisional application No. 60/622,818, filed on Oct. 28, 2004, provisional application No. 60/622,950, filed on Oct. 28, 2004, provisional application No. 60/622,949, filed on Oct. 28, 2004.

(51) Int. Cl.
*G06F 7/00* (2006.01)
*G06F 17/00* (2006.01)
*G06F 17/30* (2006.01)
*G06F 12/00* (2006.01)

(52) U.S. Cl. .................. 707/694; 707/737; 707/754; 707/751; 707/822

(58) Field of Classification Search .................. 707/200
See application file for complete search history.

(56) References Cited

U.S. PATENT DOCUMENTS 4,887,204 A  12/1989  Johnson et al.
4,897,781 A  1/1990   Chang et al.
5,151,989 A  9/1992   Johnson et al.
5,175,851 A  12/1992  Johnson et al.
5,287,507 A  2/1994   Hamilton et al.
5,313,646 A  5/1994   Hendricks et al.
5,452,447 A  9/1995   Nelson et al.

(Continued)

OTHER PUBLICATIONS http://web.archive.org/web/20030810202503/www.deepfile.com/product.html.*

(Continued)

*Primary Examiner*—Charles Rones
*Assistant Examiner*—Kris Mackes
(74) *Attorney, Agent, or Firm*—Sprinkle IP Law Group

(57) ABSTRACT

Systems and methods for identifying objects in a managed storage environment with a user and involving the user with policy implementations or decisions associated with these objects are disclosed. These systems and methods may allow a single user identity for the managed storage environment to be assigned to a user and associated with a set of user identities, each of the set of user identities corresponding to the user's identity with respect to a particular domain. Previous or subsequent to establishing a user's enterprise wide identity, data and metadata may be obtained about objects residing in one or more of the domains in the enterprise as described in detail above. Objects within these domains can then be associated with a user using the set of user identities and a report generated for the user based upon these objects, including the policies associated with these objects.

27 Claims, 18 Drawing Sheets

U.S. PATENT DOCUMENTS

| | | | |
|---|---|---|---|
| 5,745,752 | A | 4/1998 | Hurvig et al. |
| 5,764,908 | A | 6/1998 | Shoji et al. |
| 5,764,972 | A | 6/1998 | Crouse et al. |
| 5,819,292 | A | 10/1998 | Hitz et al. |
| 5,864,659 | A | 1/1999 | Kini |
| 5,870,734 | A | 2/1999 | Kao |
| 5,870,746 | A | 2/1999 | Knutson et al. |
| 5,926,805 | A | 7/1999 | Hurvig et al. |
| 5,931,918 | A | 8/1999 | Row et al. |
| 5,948,062 | A | 9/1999 | Tzelnic et al. |
| 5,987,506 | A | 11/1999 | Carter |
| 6,078,929 | A | 6/2000 | Rao |
| 6,081,807 | A | 6/2000 | Story et al. |
| 6,085,234 | A | 7/2000 | Pitts et al. |
| 6,122,629 | A | 9/2000 | Walker et al. |
| 6,134,583 | A | 10/2000 | Herriot |
| 6,161,191 | A | 12/2000 | Slaughter et al. |
| 6,173,293 | B1 | 1/2001 | Thekkath |
| 6,192,408 | B1 | 2/2001 | Vahalia et al. |
| 6,233,624 | B1 | 5/2001 | Hyder et al. |
| 6,247,139 | B1 | 6/2001 | Walker et al. |
| 6,266,785 | B1 | 7/2001 | McDowell |
| 6,298,386 | B1 | 10/2001 | Vahalia et al. |
| 6,317,844 | B1 | 11/2001 | Kleiman |
| 6,334,123 | B1 | 12/2001 | Ross et al. |
| 6,366,987 | B1 | 4/2002 | Tzelnic et al. |
| 6,385,624 | B1 | 5/2002 | Shinkai |
| 6,389,420 | B1 | 5/2002 | Vahalia et al. |
| 6,463,465 | B1 | 10/2002 | Nieuwejaar |
| 6,487,552 | B1 | 11/2002 | Lei et al. |
| 6,654,814 | B1 | 11/2003 | Britton |
| 6,754,660 | B1 | 6/2004 | MacPhail |
| 6,833,865 | B1 | 12/2004 | Fuller et al. |
| 7,017,183 | B1 | 3/2006 | Frey et al. |
| 7,249,168 | B1* | 7/2007 | Ryder ..................... 709/220 |
| 7,620,665 | B1 | 11/2009 | George et al. |
| 2002/0046262 | A1 | 4/2002 | Heilig et al. |
| 2002/0174306 | A1 | 11/2002 | Gajjar et al. |
| 2002/0198976 | A1 | 12/2002 | Davenport |
| 2003/0009469 | A1 | 1/2003 | Platt et al. |
| 2003/0135505 | A1 | 7/2003 | Hind |
| 2003/0135513 | A1 | 7/2003 | Quinn et al. |
| 2003/0212676 | A1 | 11/2003 | Bruce et al. |
| 2004/0098415 | A1 | 5/2004 | Bone et al. |
| 2004/0181753 | A1* | 9/2004 | Michaelides ............... 715/523 |
| 2005/0120025 | A1 | 6/2005 | Rodriguez et al. |
| 2005/0183143 | A1* | 8/2005 | Anderholm et al. ........... 726/22 |
| 2006/0004830 | A1 | 1/2006 | Lora et al. |
| 2006/0036605 | A1 | 2/2006 | Powell et al. |
| 2006/0089932 | A1 | 4/2006 | Buehler et al. |
| 2006/0117014 | A1 | 6/2006 | Qi |
| 2006/0184530 | A1 | 8/2006 | Song et al. |
| 2006/0190455 | A1 | 8/2006 | Braddy et al. |
| 2006/0248085 | A1 | 11/2006 | Sack et al. |
| 2006/0277184 | A1 | 12/2006 | Faitelson et al. |

OTHER PUBLICATIONS http://web.archive.org/web/20030811035225/www.deepfile.com/product_auditor.html.*
http://web.archive.org/web/20030811035459/www.deepfile.com/product_enforcer.html.*
http://web.archive.org/web/20030810211526/www.deepfile.com/solutions.html.*
http://web.archive.org/web/20030811035531/www.deepfile.com/solutions_consolidation.html.*
http://web.archive.org/web/20030811040239/www.deepfile.com/solutions_reporting.html.*
http://web.archive.org/web/20030811040409/www.deepfile.com/solutions_retention.html.*
http://web.archive.org/web/20030811040215/www.deepfile.com/solutions_hsm.html.*
http://web.archive.org/web/20030811035627/www.deepfile.com/solutions_chargeback.html.*
RFC1094 "Network Working Group Request for Comments: 1094" Sun Microsystems, Inc., accessed at www.faqs.org/rfcs/rfc1094.html, Mar. 1989, 21 pages.
"File and Storage System Design", accessed at www.eecs.harvard.edu/~vino/fs-perf/, printed Jul. 25, 2002, 3 pages.
"The extended-2 filesystem overview", vol. 1, Aug. 3, 1995, 17 pages.
"Draft-leach-cifs-v1-spec-02" Network Working Group, accessed at www.ubiqx.org/cifs/rfc-draft/draft-leach-cifs-v1-spec-02.html, Mar. 13, 1997, 172 pages.
AFS Frequently Asked Questions, accessed at www.angelfire.com/hi/plutonic/afs-faq.html, printed Jul. 25, 2002, 58 pages.
Coda File System, accessed at www.coda.cs.cmu.edu/index.html, printed Jul. 25, 2002, 2 pages.
RFC1777 "Network Working Group Request for Comments: 1777" Performance Systems International, accessed at www.faqs.org/rfcs/rfc1777.html, Mar. 1995, 18 pages.
"Active Directory: A Platform for Directory-enabled Networking", accessed at www.microsoft.com/windows2000/techinfo/planning/activedirectory/denad.asp, posted Nov. 7, 2000, 11 pages.
Pendry, "Amd An Automounter (1989)", accessed at www.citeseer.nj.nec.com/pendry89amd.html, printed Jul. 25, 2002, 1 page.
Oga, "Autofs Automounter HOWTO", accessed at www.linux-consulting.com/Amd_AutoFS/autofs.html, Dec. 1998, 2 pages.
Satran, et al. "IPS Internet Draft: iSCSI", accessed at www.ietf.org/internet-drafts/draft-ietf-ips-iscsi-14.txt, Jul. 1, 2002, 217 pages.
Rajagopal, et al. "IPS Working Group: Fibre Channel Over TCP/IP (FCIP)", accessed at www.ietf.org/internet-drafts/draft-ietf-ips-fcovertcpip-11.txt, Dec. 2002, 63 pages.
Rodriguez, et al. "IP Storage (IPS)", accessed at www.ietf.org/html/charters/ips-charter.html, Jul. 2, 2002, 5 pages.
"Distributed File System: White Paper", accessed at www.microsoft.com/windows2000/techinfo/howitworks/fileandprint/dfsnew.asp, posted Apr. 19, 1999, 2 pages.
Spuhler, "An Analysis of NFS Protocol Version 4" Hewlett Packard, available from tom_spuhler@hp.com, 31 pages.
"Intermezzo", accessed at www.inter-mezzo.org, printed Jul. 25, 2002, 1 page.
"FiST Home Page", accessed at www.cs.columbia.edu/~ezk/research/fist/, printed Jul. 25, 2002, 2 pages.
"FAM FAQ", accessed at www.oss.sgi.com/projects/fam/faq.html, Jul. 23, 2002, 6 pages.
"Yeast: A General Purpose Event-Action", vol. 21, No. 10, IEEE, accessed at www.computer.org/tse/ts1995/e0845abs.htm, Oct. 1995, 1 page.
Anderson, et al. "Serverless Network File Systems" accessed at www.citeseer.nj.nec.com/anderson95serverless.html, 1995, 3 pages.
Zukunft, "Recovering Active Databases" accessed at www.citeseer.nj.nec.com/zukunft95recovering.html, 1995, 2 pages.
Jaeger, et al., "An Annotated Bibliography on Active Databases" accessed at www.citeseer.nj.nec.com/221310/html, 1995, 2 pages.
Fowler, et al. "n-DFS: The multiple dimensional file system", pp. 135-154, pub. John Wiley & Sons Ltd., 1994, 21 pages.
Stern, et al. "Managing NFS and NIS" Second Edition, pub. By O'Reilly, Jun. 2001, 1 page.
http://web.archive.org/web/20030213030333/www.deepfile.com/product.html, printed Aug. 21, 2007, 1 page.
http://web.archive.org/web/20030213231952/www.deepfile.com/product_enforcer.html, printed Aug. 21, 2007, 2 pages.
http://web.archive.org/web/20030213031244/www.deepfile.com/solutions.html, printed Aug. 21, 2007, 1 page.
http://web.archive.org/web/20030214024310/www.deepfile.com/solutions_reporting.html, printed Aug. 21, 2007, 3 pages.
http://web.archive.org/web/20030214024344/www.deepfile.com/solutions_retention.html, printed Aug. 21, 2007, 2 pages.
http://web.archive.org/web/20030410120618/www.deepfile.com/solutions_hsm.html, printed Aug. 21, 2007, 2 pages.
http://web.archive.org/web/20030214023502/www.deepfile.com/solutions_consolidation.html, printed Aug. 21, 2007, 2 pages.

Office Action mailed Dec. 15, 2006 in U.S. Appl. No. 10/630,339, 29 pages.
Office Action mailed May 31, 2007 in U.S. Appl. No. 10/630,339, 25 pages.
Office Action mailed Nov. 1, 2007 in U.S. Appl. No. 10/630,339, 32 pages.
Office Action mailed Mar. 31, 2008 in U.S. Appl. No. 10/630,339, 28 pages.
Office Action mailed Dec. 19, 2008 in U.S. Appl. No. 10/630,339, 32 pages.
Office Action mailed Oct. 2, 2007 in U.S. Appl. No. 11/262,282, 19 pages.
Office Action mailed Apr. 17, 2008 in U.S. Appl. No. 11/262,282, 18 pages.
Office Action mailed Jul. 2, 2009 in U.S. Appl. No. 11/262,282, 18 pages.
International Search Report mailed Aug. 3, 2004 in PCT/US2003/024074, 4 pages, 7 pages.
Office Action mailed Sep. 25, 2007 in U.S. Appl. No. 11/262,283, 16 pages.
Bone, Jeff. "Beberg's Question Re: What Deepfile Does," Jun. 19, 2003. http://www.xent.com/pipermail/fork/2003-June/022380.html, 3 pages.
Office Action mailed Apr. 17, 2008 in U.S. Appl. No. 11/262,283, 14 pages.
Office Action mailed Jul. 2, 2009 in U.S. Appl. No. 11/262,283, 14 pages.
Office Action mailed Jan. 7, 2010 in U.S. Appl. No. 11/262,283, 14 pages.
Office Action mailed Jan. 7, 2010 in U.S. Appl. No. 11/262,282, 13 pages.
Office Action mailed Apr. 26, 2010 in U.S. Appl. No. 11973,846, 16 pages.
Office Action mailed Jul. 7, 2010 in U.S. Appl. No. 11/973,846, 58 pgs.
Office Action issued in U.S. Appl. No. 11/973,700, mailed Jul. 26, 2010, 16 pages.
Crichlow, "An Introduction to Distributed and Parallel Computing," 1988, Simon & Schuster, pp. 1-209.

* cited by examiner

⚛ STOREDIQ

Administrative Account  Log Out  Reference Manual

Console | Reports | Tasks and Activities | User Administration | System Configuration Reports >

Dashboard Report

Generated 10/14/2005 10:18 AM

Your company's systems administrators have sent you this dashboard report to keep you informed about how you are using your storage space.

Summary
Here is an overview of how you are using your storage space.

| Statistic | Value |
|---|---|
| Total files | 93 |
| Total bytes | 13.88M |
| Average file size | 152.86K |

Files by file classification
This list shows you how your files are organized by file classifications.

| File classification | Number of files |
|---|---|
| Acceptable Use | 58 |
| Contracts | 31 |
| Intellectual Property | 36 |
| Privacy | 77 |
| Resumes | 28 |

How often do you use your files
This list shows you how long it has been since you last looked at your files.
(You may want to delete old, unused files to save storage space.)

| Last Accessed (days) | Files | Size |
|---|---|---|
| This Week | 52 | 10.08M |
| 1 to 4 weeks ago | 41 | 3.81M |
| 1 to 3 months ago | 0 | 0.00b |
| 4 to 6 months ago | 0 | 0.00b |
| 7 to 9 months ago | 0 | 0.00b |
| 10 to 12 months ago | 0 | 0.00b |
| 1 to 2 years ago | 0 | 0.00b |
| over 2 years ago | 0 | 0.00b |
| Totals | 93 | 13.88M |

*Backup software, virus scanners and other applications may modify this attribute during normal operation. For this reason, Last accessed time may not accurately indicate end user file system activity. Consult your vendor software documentation before making decisions based on this attribute alone.

*FIG. 23a*

Top 4 Filetypes

Of all the different kinds of files you use, these are the ones that occupy the most storage space.

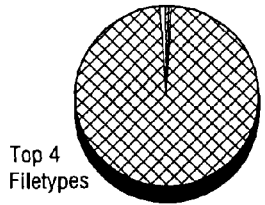

Top 4 Filetypes

| Filetype | Files | Size |
|---|---|---|
| Microsoft Word document | 89 | 13.78M |
| Adobe PDF | 1 | 50.50K |
| ZIP Compressed archive | 2 | 35.02K |
| Rich Text Format text file | 1 | 18.44K |

The size of your files

This list shows you how large your files all are. (If you keep a lot of large files, you may want to consider deleting ones you don't need.)

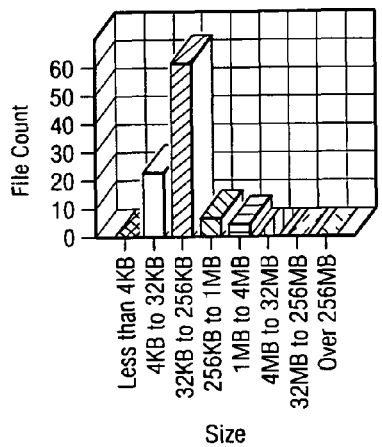

| | Count |
|---|---|
| Less than 4KB | 0 |
| 4KB to 32KB | 22 |
| 32KB to 256KB | 63 |
| 256KB to 1MB | 5 |
| 1MB to 4MB | 3 |
| 4MB to 32MB | 0 |
| 32MB to 256MB | 0 |
| Over 256MB | 0 |

What's normal?
It depends on how you use your computer:

| Small | Medium | Large | Very Large |
|---|---|---|---|
| E-mail messages usually don't get much larger than 16K each. | Microsoft Office files are usually between 50K and 500K. | Digital photos can range from 50K to 1M. | Music, video, or artwork files can often range from 4M to 100M. |

10 biggest files

These files are using up the biggest chunk of your storage space.
(If you are not using them, consider deleting them to save storage space.)

| Protocol | Server | Volume | Directory | Filename | Size |
|---|---|---|---|---|---|
| smbfs | dpfsvr | sample-DEMO-A | Other | employment adaoutline.doc | 2.96M |
| smbfs | dpfsvr | sample-DEMO-A | | ssw0311news.doc | 1.95M |
| smbfs | dpfsvr | sample-DEMO-A | | nwswr.doc | 1.62M |
| smbfs | dpfsvr | sample-DEMO-A | | LloydJohnR-8-04.doc | 789.50K |
| smbfs | dpfsvr | sample-DEMO-B | | Trademark-TTAB-v0.8-xml-dtd-elements.doc | 757.00K |
| smbfs | dpfsvr | sample-DEMO-A | Other | Press Release Allen Wise v. Bebe.doc | 407.00K |
| smbfs | dpfsvr | sample-DEMO-B | | Employment App.doc | 332.00K |
| smbfs | dpfsvr | sample-DEMO-B | | form mm2.doc | 268.50K |
| smbfs | dpfsvr | sample-DEMO-B | | RLE 3-17.doc | 225.50K |
| smbfs | dpfsvr | sample-DEMO-B | | RLE 3-18.doc | 225.50K |

© 2001 - 2005 StoredIQ Corp.

*FIG. 23b*

| Duplicates and copies | | | | | |
|---|---|---|---|---|---|
| This is a list of files using the most space due to duplication. | | | | | |
| (You might want to delete the copies to save space.) | | | | | |
| Protocol | Server | Path | Count | Size/Copy | Total |
| smbfs | dpfsvr | /RLE 3-17.doc | 2 | 225.50K | 451.00K |
| smbfs | dpfsvr | /Colin Zick 2 01319990.DOC | 3 | 49.00K | 147.00K |

All of your files

View a list of all your files

Key:
B = 1 byte (The smallest unit of file-storage measurement)
1000B in a K (Kilobyte)
1000K in a M (Megabyte)
1000M in a G (Gigabyte)
1000G in a T (Terabyte)

10/17/2005 10:09 AM | Version: 3.5.0 Build: 818.6 | © 2001 - 2005 StoredIQ Corp.
support@StoredIQ.com

*FIG. 23c*

SYSTEM AND METHOD FOR INVOLVING USERS IN OBJECT MANAGEMENT

RELATED APPLICATIONS

This application claims priority under 35 U.S.C. §119 to the following applications which are hereby fully incorporated by reference herein in their entirety: U.S. Provisional Application No. 60/622,955 filed Oct. 28, 2004 and entitled "Method and Apparatus for Building, Maintaining, and Leveraging External File System Metadata Repositories" by Jeff G. Bone, Laura Arbilla and Brett A. Funderburg; U.S. Provisional Application No. 60/622,820 filed Oct. 28, 2004 and entitled "Method and Apparatus for Harvesting File System Metadata" by Jeff G. Bone and Laura Arbilla; U.S. Provisional Application No. 60/622,733 filed Oct. 28, 2004 and entitled "Method and Apparatus for Optimizing Storage and Access of File System Metadata" by Jeff G. Bone and Laura Arbilla; U.S. Provisional Application No. 60/622,951 filed Oct. 28, 2004 and entitled "Method and Apparatus for Optimizing Storage and Access of Very Large Metadata Repositories" by Jeff G. Bone and Laura Arbilla; U.S. Provisional Application No. 60/623,027 filed Oct. 28, 2004 and entitled "Method and Apparatus for Managing the Lifecycle of Data in a File System Metadata Repository" by Jeff G. Bone and Laura Arbilla; U.S. Provisional Application No. 60/622,818 filed Oct. 28, 2004 and entitled "Method and Apparatus for Providing Programmable Actions on File System Metadata" by Jeff G. Bone and Laura Arbilla; U.S. Provisional Application No. 60/622,950 filed Oct. 28, 2004 and entitled "Method and Apparatus for Involving End-Users in File Management Policy Actions" by Jeff G. Bone, Laura Arbilla, Brett A. Funderburg and Keith Zoellner; U.S. Provisional Application No. 60/622,949 filed Oct. 28, 2004 and entitled "Method and Apparatus for Identifying End-Users Across Disparate File Systems" by Jeff G. Bone and Keith Zoellner. This application is also related to the following applications, which are hereby incorporated in their entirety herein by reference: U.S. patent application Ser. No. 11/262,283 filed Oct. 28, 2005 and entitled "Method and Apparatus for Harvesting File System Metadata" by Jeff G. Bone, Laura Arbilla, Keith Zoellner, Brad Might and Peter Lee; and U.S. patent application Ser. No. 11/262,282 filed Oct. 28, 2005 and entitled "System, Method and Apparatus for Enterprise Policy Management" by Jeff G. Bone, Laura Arbilla, Keith Zoellner, Brad Might, Jeremy Kaplan, Morry Belkin and Peter Lee.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD OF THE INVENTION

The present invention relates generally to managing and controlling data storage resources. More specifically, the present invention relates to systems, methods and apparatuses for involving users in the management of objects in file based data storage.

BACKGROUND OF THE INVENTION

Today's computers require memory to hold or store both the steps or instructions of programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer.

Similarly, secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "filesystem." In a filesystem, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. Directories are containers that provide a mapping from directory-unique names to other directories and files. Files are containers for arbitrary data. Because directories may contain other directories, the filesystem client (human user, software application, etc.) perceives the storage to be organized into a quasi-hierarchical structure or "tree" of directories and files. This structure may be navigated by providing the unique names necessary to identify a directory inside another directory at each traversed level of the structure; hence, the organizational structure of names is sometimes said to constitute a "filesystem namespace.".

Filesystems support a finite set of operations (such as create, open, read, write, close, delete, etc.) on each of the abstract objects which the filesystem contains. For each of these operations, the filesystem takes a particular action in accordance with the operation in question and the data provided in the operation. The sequence of these operations over time affects changes to the filesystem structure, data, and metadata in a predictable way. The set of filesystem abstractions, operations, and predictable results for particular actions is said to constitute a "semantics" for the filesystem. While particular filesystems differ slightly in their precise semantics, in general filesystems implement as a subset of their full semantics a common semantics. This approximately equivalent common semantics can be regarded as the "conventional" or "traditional" filesystem semantics. Storage resources accessed by some computer, its software or users need not be "directly" attached to that computer. Various mechanisms exist for allowing software or users on one computing device to access over a network and use storage assets that are actually located on another remote computer or device. There are many types of remote storage access facilities, but they may without loss of generality be regarded to fall into one of two classes: block-level and file-level. File-level remote storage access mechanisms extend the filesystem interface and namespace across the network, enabling clients to access and utilize the files and directories as if they were local. Such systems are therefore typically called "network file systems," which may refer to the aggregation of more than one type of filesystem, Note that the term "network file system" is used herein generally to refer to all such systems—there is a network file system called Network File System or NFS, originally developed at Sun Microsystems and now in the public domain. When discussing the general class of such systems herein, the lower-case term, e.g., "networked file systems" will be used. When discussing the specific Sun-developed networked file system, the fully capitalized version of the term or its acronym, e.g., "Network File System or NFS" will be used.

Networked file systems enable machines to access filesystems that reside on other machines. Architecturally, this leads to the following distinctions: in the context of a given filesystem, one machine plays the role of a filesystem "origin server" (alternatively, "fileserver" or "server") and another plays the role of a filesystem client. The two are connected via a data transmission network. The client and server communicate over this network using standardized network protocols; the high-level protocols which extend the filesystem namespace and abstractions across the network are referred to as "network filesystem protocols." Exemplary filesystem protocols include the Common Internet File System (CIFS), the aforementioned NFS, Novell's Netware filesharing system, Apple's Appleshare, the Andrew File System (AFS), and the Coda Filesystem (Coda). CIFS and NFS are by far the most prevalent. These network filesystem protocols share an approximately equivalent semantics and set of abstractions, but differ in their details and are noninteroperable. Thus, to use a filesystem from a fileserver, a client must "speak the same language," i.e., have software that implements the same protocol that the fileserver uses.

A fileserver indicates which portions of its filesystems are available to remote clients by defining "exports" or "shares." To access a particular remote fileserver's filesystems, a client must then make those exports or shares of interest available by including them by reference as part of their own filesystem namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which "has" the resources of interest to the client.

In addition to organizing and maintaining the relationships between filesystem clients and file servers, additional challenges exist in managing access to and utilization of filesystems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on fileservers for the storage of certain personal files and content types, for instance, MP3s, personal digital images, and so on. This "policy" usually takes the form of a memo, email, etc. The administrators in charge of enforcing this policy face significant challenges. Conventional filesystems do not provide mechanisms for configuring a filesystem to only allow particular content types or otherwise make decisions about what should be stored, where, and how. These conventional filesystems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

In today's increasingly litigious environment and in the presence of new rules and regulations such as the Health Insurance Portability and Accountability Act of 1996 (HIPAA) and the Sarbanes-Oxley Act of 2002, the lack of management, including the inability to enforce policies consistently and effectively, represents a serious risk that corporations and businesses alike must rush to address. Unfortunately, as a direct result of the general lack of innovation and improvement in filesystem architecture over the last 30 years, viable solutions that could provide practical and effective policy management to enterprises do not seem to exist.

Perhaps a general comparison between typical databases systems and typical filesystems will serve to illustrate the previous lack of innovation and improvement in filesystem architecture. For databases, storage is usually organized into tables arranged in a flat space (i.e., tables may not be contained in other tables) which contain records with generally fixed form. Such database systems often provide a notion of "triggers" and "stored procedures." Triggers define a set of conditions; when the database is manipulated in a way that matches some condition, the stored procedure associated with that trigger is executed, potentially modifying the transaction or operation. This mechanism is used primarily in two ways in database applications: to ensure data correctness and integrity and to automate certain administrative and application-specific tasks. The analogous facility is not available in filesystems because filesystems are quasi-hierarchical collections of directories and files. As such, triggers cannot be defined with associated stored procedures that can be automatically activated and enacted synchronous with a filesystem activity in any extant filesystem.

In general, implementation of triggers and stored procedures in filesystems is significantly more complex than in databases systems because of less regular structure of filesystems, their less formally well-defined semantics, and because file data is itself arbitrarily semi-structured and loosely typed. Implementation of programmable procedures which respond to an arbitrary filesystem operation by modifying the operation is challenging when the correct (i.e., traditional, expected, etc.) semantics of filesystems must be preserved. There are existing systems that will generate "events" when operations occur on the filesystem; these events can then be used to activate arbitrary actions post-facto. However, the actions cannot themselves modify the file operation, since the event which activates them is not generated until the triggering operation completes.

Currently, the "intelligence" that a conventional filesystem exhibits with respect to access control is typically restricted to a static set of rules defining file owners, permissions, and access control lists. To the extent even this relatively low level of "intelligence" exists, it is usually statically defined as a part of the filesystem implementation and may not be extended.

In part, this is because in a typical enterprise, the files and directories stored in the enterprise filesystems represent unstructured or semi-structured business intelligence, which comprises the work product and intellectual property produced by its knowledge workers. The work product may include business-critical assets and may range from Excel spreadsheets representing (collectively) the financial health and state of the enterprise to domain-specific artifacts such as Word documents representing memos to customers. However, in contrast to the data in "mission critical" information systems such as logistics systems, inventory systems, order processing systems, customer service systems, and other "glass house" applications, the unstructured and semi-structured information stored in the enterprise filesystems is largely "unmanaged." It is perhaps backed up but little or no effort is made to understand what the information is, what its relevance or importance to the business might be, or even whether it is appropriately secured.

As examples, assuming that a user 'Idunno' has stored unauthorized and illegal copies of MP3 music files in a "home directory" on some file server that belong to a corporation 'Big Corp' where Idunno works. In doing so, Idunno has perhaps violated a corporate policy of Big Corp stating that no MP3 files are to be stored on the network. However, since the "home directory" is not visible to the system managers, the system managers have no knowledge to this violation, nor any automated means of remedying the situation. Even in the event that the system managers are able to episodically inventory the filesystems for such violators, they are often loathe to automatically take appropriate actions (e.g., deleting) on such offending files. The reason is that, more often than not, while they have the responsibility for enforcing such policies, they do not have the authority to do so. To remedy this, the end-user (i.e., the file owner—in this example, Idunno) or some other responsible party must be brought "into the loop." Other examples of file management policies might include: documents relating to patients' individual medical conditions within a healthcare provider business might be stored in such a way that perhaps would violate the privacy constraints of HIPAA; or financial documents within the finance operation of a Fortune 2000 company might be stored in such a way that perhaps would violate both regulatory requirements under the Sarbanes-Oxley Act of 2002 and internal corporate governance considerations.

The pressing need to monitor filesystems and to report activities related to the filesystems presents a challenge of unprecedented scope and scale on many fronts. Filesystem activity produces changes to the state of a filesystem. This activity can affect changes to the structure, the stored metadata, and the stored data of the directories and files. Generally speaking, this activity is not logged in any way; rather, the filesystem itself holds its current state. Some filesystems—called "journaling" filesystems—maintain transient logs of changes for a short duration as a means of implementing the filesystem itself; however, these logs are not typically organized in any way conducive to monitoring and reporting on the state of the filesystem and its activity and are not made available to external programs for that purpose. Further, these logs are frequently purged and therefore provide a poor basis for reporting of historical and trend data.

One significant and open problem is that of collection, redaction, and analysis of high-level data about what a filesystem is being used for, what is stored in it, by whom and for what purpose. Solutions today involve software programs or users explicitly walking through the filesystem structure, gathering the data required, and then analyzing it and/or acting on it, etc. Collection of filesystem data proactively as operations occur is generally not done as it is generally not supported by the filesystem itself. Furthermore, the accuracy of such collected data is usually questionable, as it reflects not an instantaneous state of the filesystem at any given moment, but, rather, an approximate state of the filesystem over the duration of the run. Without collecting and maintaining the appropriate statistics as file operations occur, it is impossible for the data, at the end of the run, to represent a correct and accurate picture of the contents of the filesystem at that time.

Collection and storage of all such data as it occurs could also be untenably burdensome; such logs would "grow" quickly and consume additional storage capacity at an undesirable rate. The ability to both collect such data as it occurs and dynamically redact or "historize" it would allow ongoing statistics to be maintained while simultaneously constraining the total amount of storage capacity that must be dedicated to such a purpose.

The problem of data collection and reporting is further compounded in a networked filesystem environment. Because each server—indeed, each filesystem on each server—is a separate entity, it is therefore necessary to perform each data collection independently on each server. If reporting or monitoring is to be done across the network filesystem environment, significant challenges exist; namely, because of the parallel and discrete nature of the collection runs, it becomes difficult or impossible to sensibly merge the collected data into a consistent snapshot of the state of the filesystem at some time.

This is particularly true with respect to collecting data pertaining to a certain users across a myriad number of filesystems which may exist in a networked filesystem environment. In order to bring an end-user "into the loop" with respect to the policies implemented by a particular organization it is highly desirable to be able to identify an end-user with objects residing in the networked filesystem environment. However, this may be a difficult task. As discussed above the networked filesystem environment may be composed of a number of heterogenous types of filesystems, and, additionally, a single end-user may have different user identities associated with one or more of these filesystems.

Returning to the end-user "Idunno" of the above example, on one particular filesystem (a particular NFS filesystem in the networked filesystem environment, for example) end-user Idunno's user identification may be "I_Dunno", while in another filesystem Idunno's user identification may be "Idunnojack". Thus, to associate objects across a networked filesystem with a single user in order to involve a user with policy implementation may be difficult, as it may be difficult to identify an end-user associated with a file on which a policy is, or should be, implemented.

As can be seen then, it is desirable to have systems and methods which may allow the identification of objects in disparate and heterogeneous filesystems with a single user, and which may furthermore allow these users to be involved in policy implementation with respect to these, or other, objects.

SUMMARY OF THE INVENTION

Systems and methods for identifying objects in a managed storage environment with a user and involving the user with policy implementations or decisions associated with these objects are disclosed. These systems and methods may allow a single user identity for the managed storage environment (i.e. enterprise wide user identification) to be assigned to a user and associated with a set of user identities, each of the set of user identities corresponding to the user's identity with respect to a particular domain. Previous or subsequent to establishing a user's enterprise wide identity, data and metadata may be obtained about objects residing in one or more of the domains in the enterprise as described in detail above. Objects within these domains can then be associated with a user using the set of user identities and a report generated for the user based upon these objects, including the policies associated with these objects.

In one embodiment, an enterprise wide user identity is associated with a set of user identities. Each of these user identities may be associated with one or more filessytems or domains. Based on these user identities a set of records may be located in the metadata repository. Each of these records may be comprise data associated with an object in a filessytem in the managed storage environment. Using these records a report may be generated for a user.

In another embodiment, this report may be an HTML document comprising data regarding the user's policy violations or, possibly, other data regarding the records or associated objects associated with the set of user identities.

In other embodiments, the report may be provided to the user using email. The report may also comprise remedial actions, or links to remedial actions, which may be taken with respect to one or more of the policy violations associated with the records or object.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

Embodiments of the present invention provide many technical advantages. For example, data regarding a user's usage of a managed storage environment, policy violations of that user, etc. may be gathered regardless of the fact that the managed storage environment may comprise many disparate filesytems both in the physical and the logical sense.

Additionally, actions which a user may take may be associated with the policy violations or objects presented to the user in the report. Thus, a user may be able to analyze his filesystem usage and take actions based on a single report though these objects may reside on disparate filesystems.

Additional objects and advantages of the present invention will become apparent to one skilled in the art upon reading and understanding exemplary embodiments described herein with reference to the following drawings.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 1-4 are schematic diagrams illustrating an exemplary architecture in which embodiments of the invention may be implemented, wherein FIG. 1 illustrates a computer system connected to a data transmission network, FIG. 2 illustrates a network file system architecture, FIG. 3 illustrates a 2-tier network file system software architecture, and FIG. 4 illustrates a network file system architectural view with a file management apparatus.

FIGS. 5-12 are schematic diagrams depicting a first set of embodiments, in which FIG. 5 depicts a harvester architecture, according to one embodiment of the invention, FIG. 6 depicts a schema for storing mixed sparse/dense attributes in a file system metadata repository, according to one embodiment of the invention, FIG. 7 depicts views over file system metadata, according to one embodiment of the invention, FIG. 8 depicts the logical software architecture of a file management application, according to one embodiment of the invention, FIG. 9 depicts the operation of a single filter on a set of metadata records, according to one embodiment of the invention, FIG. 10 depicts feeding actions from filters, according to one embodiment of the invention, and FIGS. 11-12 depict a file system's structure and organization before and after the execution of a policy, according to one embodiment of the invention.

FIG. 15 is a block diagram illustrating how policy rules can be expressed in terms of conditions and actions, according to one embodiment of the invention, FIG. 16 is a block diagram depicting a system platform, according to one embodiment of the invention, FIG. 17 is a block diagram illustrating a high level architectural view of a system platform, according to one embodiment of the invention, FIG. 18 is a block diagram illustrating a federated architecture, according to one embodiment of the invention, FIGS. 23A-C depict one embodiment of a report which may be provided to a user.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
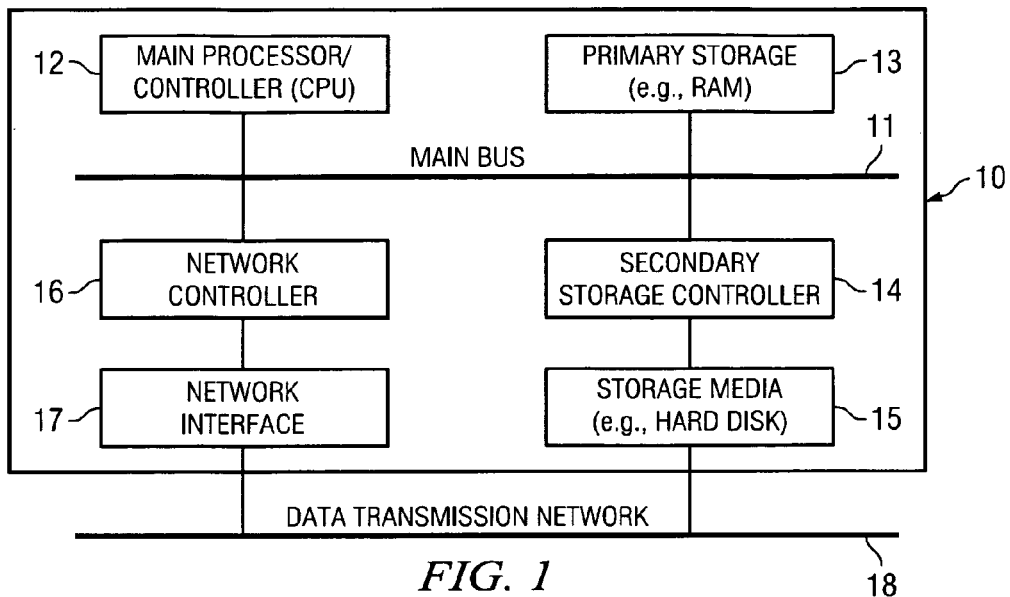

Before describing embodiments of the present invention, it may be useful to describe an exemplary architectures and embodiments which may be utilized in conjunction with embodiments of the present invention. The systems and methods disclosed herein can be implemented as an integrated component of various applications, such as a network file system management device. By way of example, FIG. 1 shows a network file system management device 10 (also referred to herein as "the device" or "the management device" or "the appliance"). In one embodiment, the management device (i.e., an integrated component of various applications) is embodied in a computer system programmed with at least one software component or software system, which is described in greater detail below and which is executable by a central processor unit (CPU) 12 of computer system 10. Computer system 10 may embody the various components of the management device and subsystems with which it interacts.

In this example, computer system 10 embodying the management device comprises a main bus 11, a main processor 12, a primary storage 13, a secondary storage controller 14, a storage media 15, and optionally a network controller 16, a network interface 17, and a data transmission network 18. Other devices which may be connected to or form part of computer system 10 may include display, mouse, keyboard, and so on. Main processor 12 can be a general purpose processor, a limited processor such as an application-specific integrated circuit (ASIC) or microcontroller, or any other instruction execution machine. Primary storage 13 provides a transient memory or storage space for use by programs executing on main processor 12. Main processor 12 communicates with primary storage 13 in a conventional manner.

Main processor 12 communicates with secondary storage controller 14 by way of main bus 11. Secondary storage controller 14 connects storage media 15 to main processor 12 by way of main bus 11. Storage media 15 may be a hard drive, compact disc read only memory (CD-ROM) drive, floppy drive, tape drive, optical storage medium, or other storage device. Secondary storage controller 14 is used to read and/or write storage media 15 on behalf of main processor 12.

Computer system 10 may communicate with other computers by way of a data transmission network 18. This is accomplished by attaching a network interface 17 to data transmission network 18, attaching network interface 17 to network controller 16, and connecting network controller 16 to main bus 11. Software running on main processor 12 may then access other computers across data transmission network 18 in any of the conventional ways, e.g., by executing "protocols" which affect the transmission and reception of protocol data units, packets, etc. over data transmission network 18.

According to one embodiment of the invention, the software component(s), which can be stored in memory of various forms, of the management device operates to cause computer system 10 to perform the following functions: (1) harvesting file and directory metadata from network file systems; (2) allowing reporting and ad hoc query functions over harvested metadata; (3) providing a mechanism that defines file management policies over managed storage(s) and that enables automated execution of such policies; (4) allowing such policies to trigger arbitrary actions which may change the state of the managed storage(s), such as, and without loss of generality, deleting files, compressing files, moving files, "flagging" files for backup, checking files into a document management system, indexing files for use in content search, generating reports, executing policies, and so on; and (5) providing a workflow model which allows human users to be included in the file management workflow such that they may be prompted for their approval before any given action are taken to bring the managed storage(s) into compliance with defined policies.

A skilled artisan will recognize that in addition to embodiments shown and described with reference to the drawings disclosed herein, other embodiments are possible. In particular, it is possible to compose components/subsystems described herein in various ways, for example, disabling certain of the functions (1)-(5) above. One embodiment described herein can address these functions (1)-(5) simultaneously. However, it should be understood that each of the subsystems (and each of the functions (1)-(5)) are independent of one another and embodiments of the invention can comprise a number of subsystems running any subset of these functions (1)-(5). Moreover, it should be noted that each of the functions (1)-(5) above and their corresponding subsystems and/or software implementations need not reside on a single computer. They can be distributed across multiple distinct computers according to embodiments of the invention.

Figure 2:
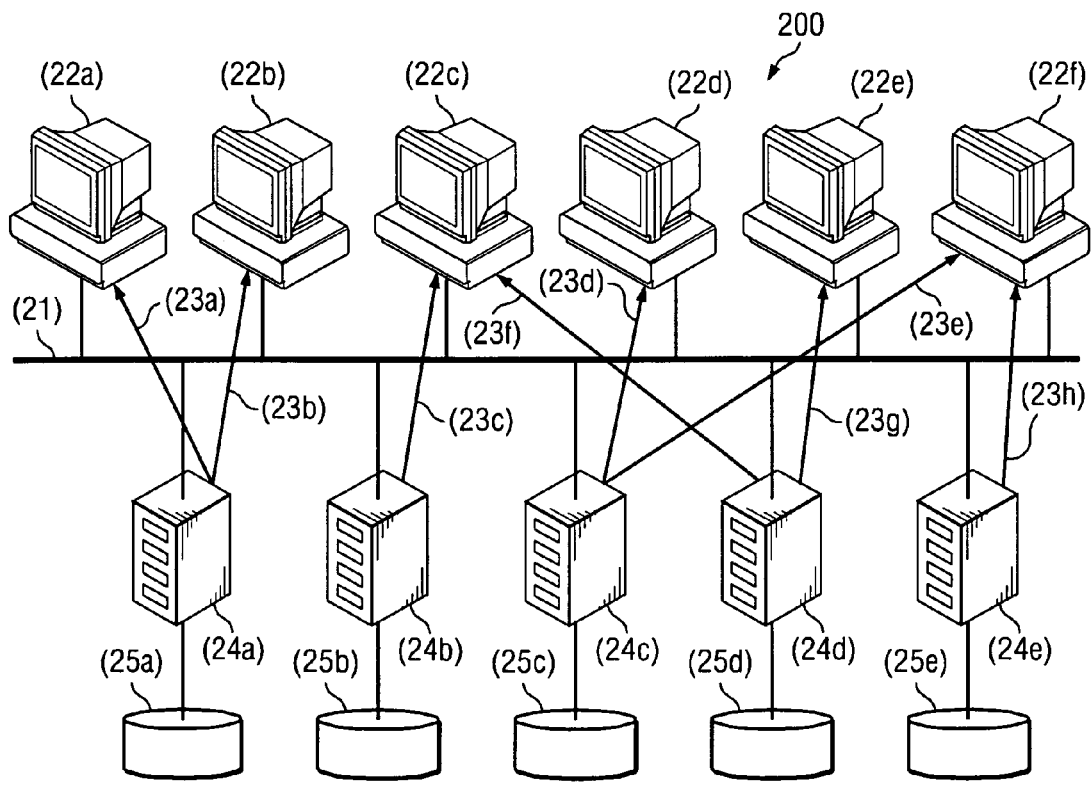

FIG. 2 is a block diagram representation of a 2-tier network file system architecture 200 comprising a data transmission network (or network) 21, a plurality of servers 24a-24e, a plurality of storage media devices with file systems 25a-25e attached to servers 24a-24e, and a plurality of client computers 22a-22f. The network file system itself is represented as connections or "mounts" 23a-23h. Each of the mounts 23a-23h is understood to be a logical rather than physical connection between the associated server and client machines. More precisely, this connection is understood to be the logical relationship between some part or all of the relevant file systems attached to the associated server machine and shared out over a certain network file system protocol (explained further below) and the associated client machine's own file system software.

Figure 3:
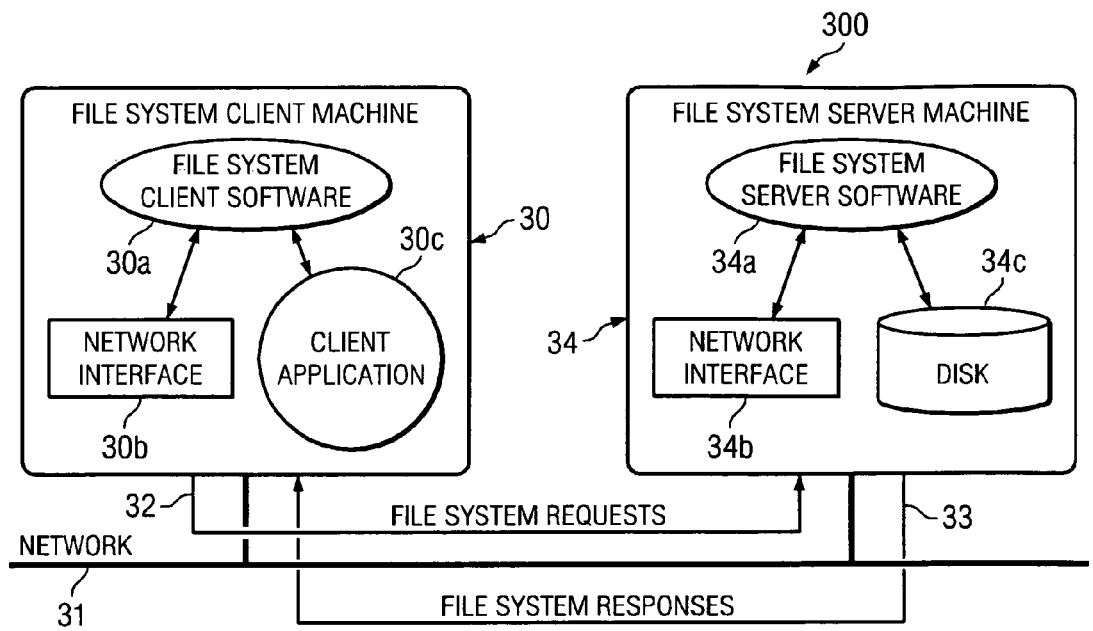

FIG. 3 is a block diagram depicting the software architecture 300 of a 2-tier network file system, as illustrated by a single client-server pair. It comprises a network file system client machine (or client) 30 (e.g., a computer), a data transmission network 31, and a network file system server machine (or server) 34 (e.g., a computer). In this embodiment, client 30 includes file system client software 30a, network interface 30b, and client application 30c. Client 30 and server 34 communicate with each other over network 31 by exchanging file system requests 32 and responses 33. The rules by which such an exchange occur are known as a network file system protocol. There can be arbitrarily many such network file system protocols. Embodiments of the present invention are independent of and thus not limited by any particular network file system protocol.

When client application 30c wishes to access a storage medium, for example, disk 34c, located on server 34, file system client software 30a can intercept this request and direct it over network 31 to server 34, thereby generating a request 32. Network interface 34b of server 34 receives this request and directs it to file system server software 34a, which may then perform the requested action on disk 34c. Upon completion of the requested action, server 34 constructs a response 33 and directs it back to the sender (client 30) via network 31. Network interface 30b of client 30 receives this response and directs it to file system client software 30a, which in turn responds to the waiting client application 30c, thus completing a network transaction.

Figure 4:
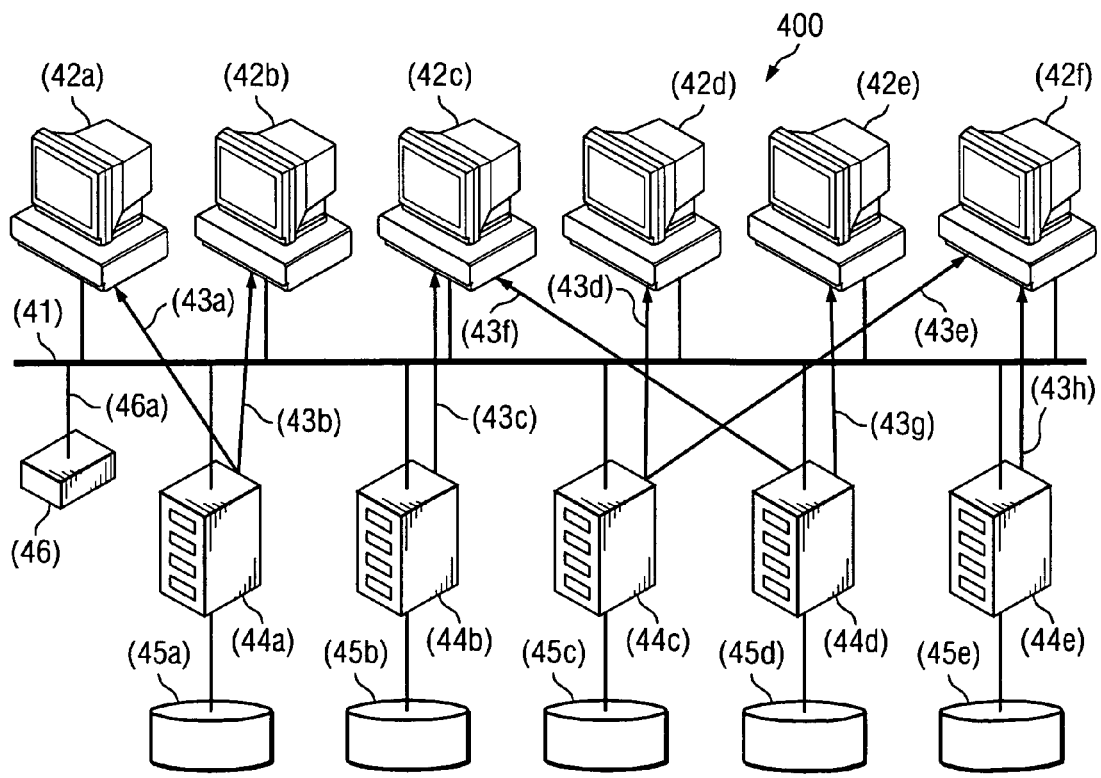

FIG. 4 is a block diagram representation of a 2-tier network file system architecture 400 comprising a data transmission network (or network) 41, a plurality of servers 44a-44e, a plurality of storage media devices with file systems 45a-45e attached to servers 44a-44e, and a plurality of client computers 42a-42f. The network file system itself is represented as the connections or "mounts" 43a-43h. Each of the mounts

43a-43h is understood to be a logical rather than physical connection between the associated server and client machines. More precisely, this connection is understood to be the logical relationship between some part or all of the relevant file systems attached to the associated server and shared out over a certain network file system protocol, and the associated client machine's own file system software. In this embodiment, a file management device or devices 46 are attached to network 41 via line 46a and may themselves mount and access any of the file systems served by servers 44a-44e in the same manner and at any time as any of the mounts 43a-43h accesses clients 42a-42f. Device(s) 46 may implement all or any combination of the functions (1)-(5) listed above, more details of which will now be described with reference to FIGS. 5-13.

Function (1): Harvesting File and Directory Metadata from Network File Systems.

Figure 5:
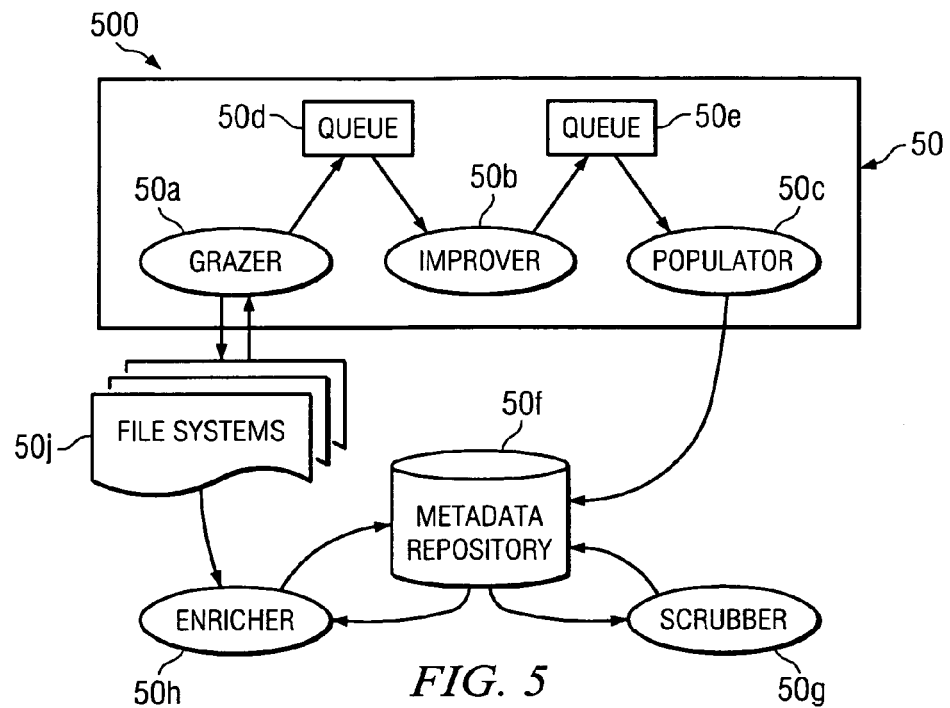

In one embodiment, the management device is configured with a software component referred to as a "harvester" for harvesting file and directory metadata from network file systems in a fast and efficient manner. FIG. 5 is a block diagram depicting a system 500 comprising a harvester 50, file systems 50j, and a metadata repository 50f. Harvester 50 in this embodiment comprises several discrete components, including a grazer 50a, an improver 50b, a populator 50c, a queue (or grazer-improver queue) 50d connecting grazer 50a and improver 50b, and a queue (or improver-populator) 50e connecting improver 50b and populator 50c.

It should be understood that components 50a-50e of harvester 50 may reside at one computer system (e.g., computer system 10) or more than one computer as described above with reference to FIG. 1. For example, queues between remote components could be configured to support some remote network interface capable of transmitting and receiving data across data transmission networks. Such a remote network interface can take many forms including industry-standard remote procedure call (RPC) protocols, hypertext transfer protocol (HTTP), Common Object Request Broker Architecture (CORBA), Distributed Component Object Model (DCOM), and so on. CORBA and DCOM are designed to support objects created in any language.

FIG. 5 illustrates the interactions between harvester 50 and file systems 50j in the process of "harvesting" metadata from file systems 50j, according to one embodiment of the invention. In this example, grazer 50a interacts with file systems 50j to receive its file metadata. In this embodiment, the metadata is "canonicalized" (i.e., transformed into a common representation, for example, attribute-value pairs, extensible markup language (XML), or any other suitable data representation that is understood by improver 50b). Each metadata "record" (i.e., a set of attributes associated with a file or directory that is being "grazed") is placed in queue 50d. FIG. 5 also shows the interactions between harvester 50 and other system components of system 500, particularly with regard to concurrency. In this embodiment, grazer 50a, improver 50b, and populator 50c, each runs in its own thread, asynchronously and concurrently with one another. These subcomponents are loosely coupled and coordinated by way of queues 50d-50e and by way of their "parent component" (i.e., harvester 50) process lifecycle and context.

In this embodiment, improver 50b operates to synthesize or calculate any desired attributes that may be computed from the raw metadata collected by grazer 50a. As improver 50b reads content out of queue 50d, it can improve, if necessary, the set of attributes associated with each metadata record for each file or directory. Improver 50b is configured to perform a plurality of computations including checksums, hashes, basic file typing, and so forth. In one embodiment, all operations that interact with the file content directly are performed via improver 50b to take advantage of cache locality on the file server. Upon completion of "improvement" of each file or directory metadata, the transformed metadata record is placed in queue 50e.

According to the embodiment shown in FIG. 5, populator 50c reads the improved metadata records from queue 50e and inserts them into a metadata repository 50f according to some scheduling heuristic. In one embodiment, this is done in a batch fashion so that a plurality of insertions can be combined into a single bulk upload to amortize the cost of the database operation across many metadata records. Other methodologies can also be used.

In one embodiment, a scrubber 50g may be included to read the metadata repository 50f and make judgments about the "freshness" of the data in the metadata repository 50f on an item-by-item basis. Depending upon the freshness of each item, scrubber 50g may determine when to deprecate, expire, or otherwise garbage collect metadata.

In one embodiment, an enricher 50h may be included to perform metadata collection tasks: (a) that are likely to be lengthy and/or performance intensive, (b) that require interaction with the file system or other external system in some idiosyncratic fashion, and (c) whose purpose is the collection of "optional" metadata which is not required for the normal or baseline functioning of the system. Examples might include: high-level semantic classification of certain document types, full-text indexing of suitable documents, etc. In such cases, enricher 50h may retrieve a list of enrichment candidates from metadata repository 50f, perform one or more desired enrichment operations, and update the associated metadata in metadata repository 50f.

Figure 6:
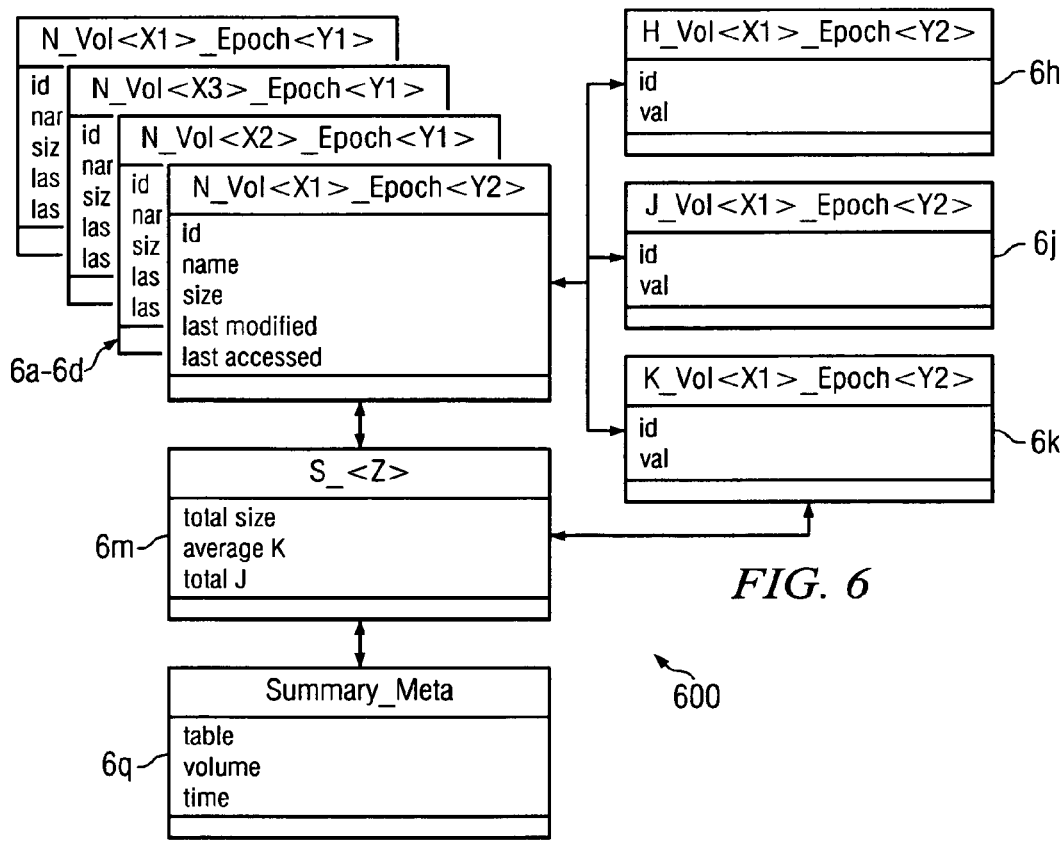

FIG. 6 depicts a schema 600 for storing file system metadata that mixes both sparse and dense attribute spaces within a single relational database. Each volume (i.e., a logical collection of files and directories, e.g., a mountable share where subject files reside on a server) is given its own "node data" table representing the denormalized dense attribute space common to all file systems. More than one of these node data tables may exist for a single volume. These node data tables are "timestamped" by an "epoch" corresponding to the system's definition with regard to the "freshness" of the data contained therein. Each node data table follows a fixed schema, and each row corresponds to the dense set of attributes for all files and directories on that volume. A set of exemplary node data tables is depicted as objects 6a-6d in FIG. 6.

For the sparse attributes (i.e., those attributes that are not shared by all files and directories in a file system), a single table exists for every attribute-volume-epoch combination. In FIG. 6, a set of three attribute tables 6h, 6j, 6k respectively contains attributes called "H," "J," and "K". Each attribute table 6h, 6j, 6k follows a simple schema: each row in attribute table 6h, 6j, 6k has an object identifier (id) that is used as a foreign key in joining each attribute table 6h, 6j, 6k to an appropriate node data table, and a value (val) for the attribute. In one embodiment, assuming all instances of the same attribute have the same type, it is not necessary to store type information in the attribute table directly. In that case, it is represented as usual in the data catalog/schema facility of a relational database. Foreign key relationships between the id field in the node data tables 6a-6d and the id field in the corresponding attribute tables 6h-6k are used to join the tables as needed.

In one embodiment, summary tables may be included to provide pre-computed roll-ups, aggregates, or other computations over one or more node data tables and/or one or more associated attribute tables. Summary tables serve to minimize query time for queries involving these types of computations. Summary tables may be generated either in response to changes to the set of tables (e.g., adding a new node data table, etc.) or on-demand (e.g., whenever a "synthetic" summary attribute is first referenced in some query). They remain valid only as long as their referenced node data tables are still "fresh" and are deprecated and eventually garbage collected when their associated/referenced source tables are deprecated and/or garbage collected. An exemplary summary table 6m is depicted in FIG. 6.

Summary table metadata is maintained by the underlying system (e.g., system 500) so that the system knows which summary tables correspond to which source node data tables or attribute tables. Summary table metadata is maintained via a Summary_Meta catalog table which records this information. The Summary_Meta information can be joined, linked, or correlated to the associated summary tables via the database's own metadata and data catalog facilities and/or through known naming conventions. An exemplary Summary_Meta catalog table 6q is depicted in FIG. 6.

Figure 7:
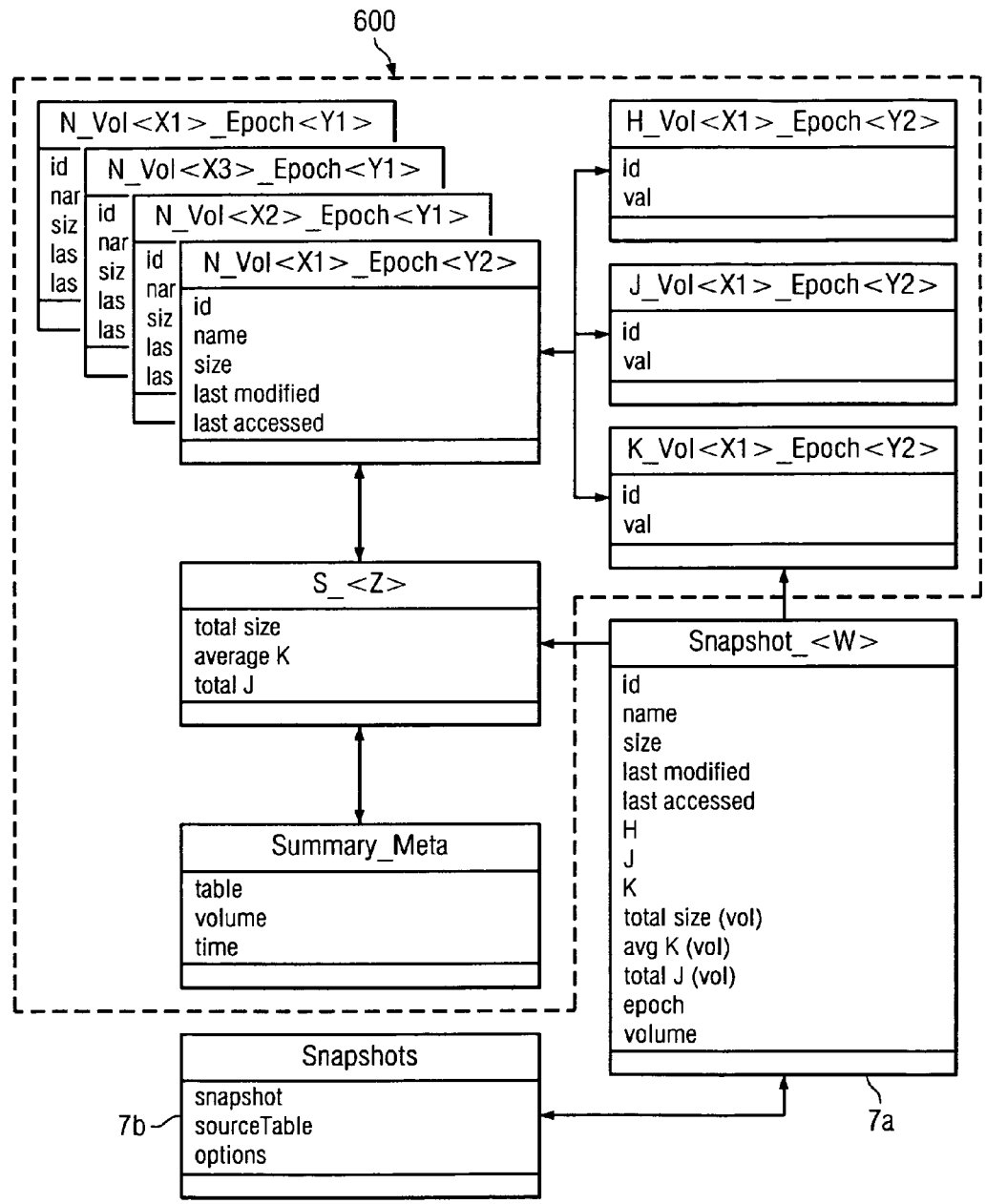

FIG. 7 depicts a view ("snapshot") 7a over much of the data associated with a set of volumes. As with summary tables described above with reference to FIG. 6, "snapshot" tables have their own lifecycle, referential integrity, and other considerations. Such snapshots can be synthesized on-the-fly by a query pre-processor or optimizer. Alternatively, they can be constructed statically either inside or outside of the lifecycle of the underlying tables. Metadata about these snapshot tables is kept in a separate Snapshots metadata catalog 7b, which can be joined, linked, or correlated with view 7a either by way of the underlying database's own metadata catalog and/or by way of known naming conventions.

Function (2): Allowing Reporting and Ad Hoc Query Functions Over Harvested Metadata.

Figure 8:
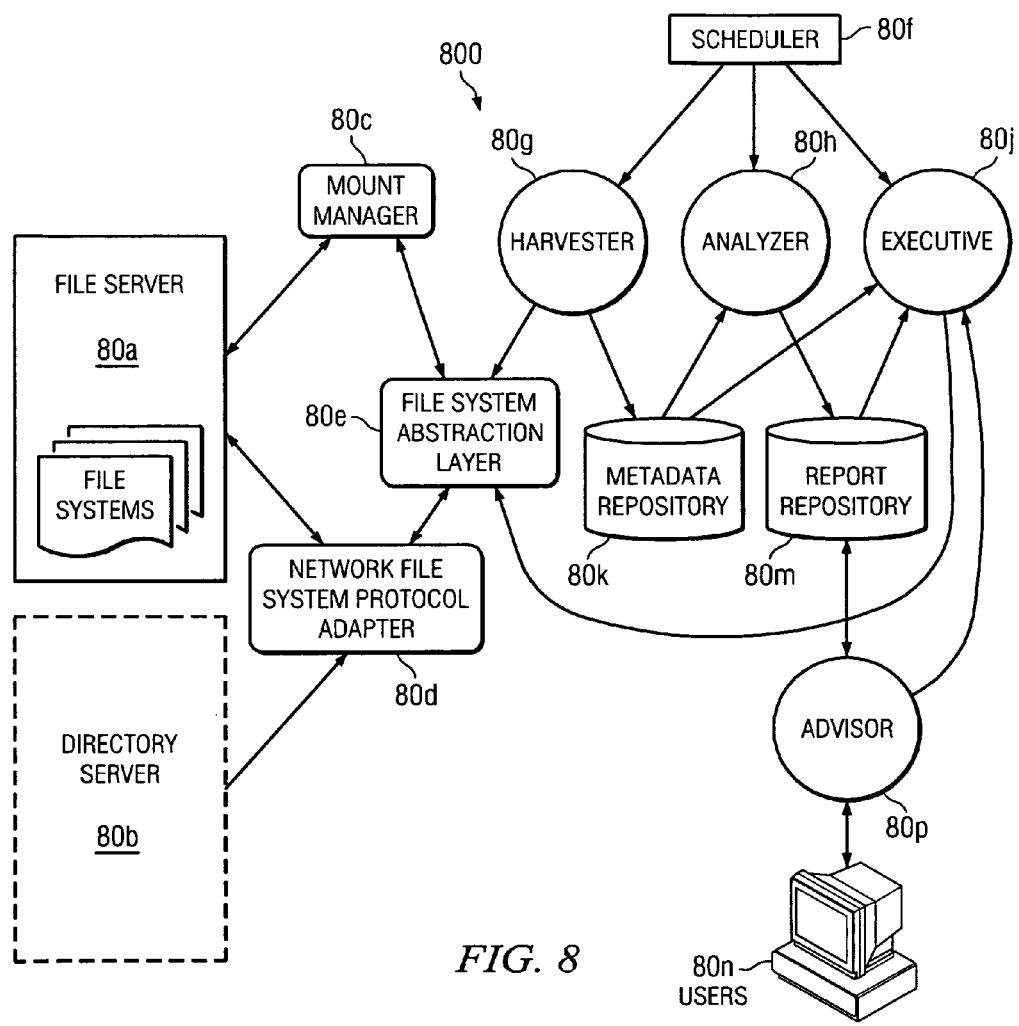

In one embodiment, the management device is configured with a file management software system that allows for reporting and ad hoc query functions over harvested metadata. FIG. 8 is a block diagram depicting the logical software architecture of a file management system 800 according to one embodiment of the invention. In this embodiment, system 800 comprises one or more of the following components: a scheduler 80f, a harvester 80g, an analyzer 80h, an executive 80j, a metadata repository 80k, a report repository 80m, an advisor 80p, a file server or file system 80a, a mount manager 80c, a network file system protocol adaptor 80d, a file system interface abstraction layer 80e, zero or more directory servers or authentication domain servers 80b, and one or more users 80n. These components can be deployed on one or more computers connected by one or more data networks, as described above with reference to FIG. 1.

In this embodiment, mount manager 80c mounts file systems from file server or servers 80a and interacts with them according to typical file system protocols. Mount manager 80c provides the generic abstraction of file system interaction semantics that are common to most or all file systems.

In this embodiment, file system protocol adaptor 80d provides interfaces to file system and protocol specific operations and semantics, for instance, obtaining and/or modifying Access Control Lists (ACLs) in file systems and protocols that support ACLs rather than more primitive permissions operations. File system protocol adaptor 80d also provides interfaces to directory servers, authentication and authorization domain services, and so forth, on a per-file system protocol, per-domain basis.

In this embodiment, file system interface abstraction layer 80e provides a common interface to both mount manager 80c and file system protocol adaptor 80d for use by higher-level components such as harvester 80g, analyzer 80h, and executive 80j.

In this embodiment, scheduler 80f runs other components according to a configured schedule. Components that may be run by scheduler 80f include harvester 80g, analyzer 80h, and executive 80j. Harvester 80g makes use of file system interface abstraction layer 80e to collect file and directory metadata from the managed file systems 80a and to aggregate it in metadata repository 80k. Analyzer 80h utilizes the metadata stored in metadata repository 80k to generate reports and stores them in report repository 80m.

Function (3): Providing a Mechanism for Defining File Management Policies Over Managed Storage and Enabling Automated Execution of Such Policies.

Referring to FIG. 8, in this embodiment, executive 80j reads information from metadata repository 80k and potentially information from report repository 80m to make decisions (without human intervention) about what actions to take on the managed files and directories residing, for example, at file server 80a and directory server 80b. These actions may be specified in accordance with certain defined policies. Exemplary actions will be described in greater details later. They can be taken by exercising file system interface abstraction layer 80e and may be triggered automatically and/or manually in a variety of ways, for example, by a scheduled query, or by interacting with an end user as described below.

In this embodiment, an end user 80n can view reports that have been generated by analyzer 80h and stored in report repository 80m. This user review process is mediated by an advisor 80p which operates to render a user interface to user 80n. These reports may present user 80n with a list of files and directories and a variety of options to act on them. If user 80n chooses any of these actions, executive 80j is informed of the chosen action(s). In response, executive 80j proceeds to execute the chosen action(s) via file system interface abstraction layer 80e. It should be understood that the user interface presented by advisor 80p may be a Web-based interface, a "thick client" interface, a command line interface, an active HTML-based e-mail interface, or any other form of user interface. It should also be understood that the chosen actions may be executed synchronously or asynchronously. In the latter case, they may be executed immediately or batched for later execution.

Function (4): Allowing Such Policies to Trigger Arbitrary Actions which May Change the State of Managed Storage(s).

Figure 9:
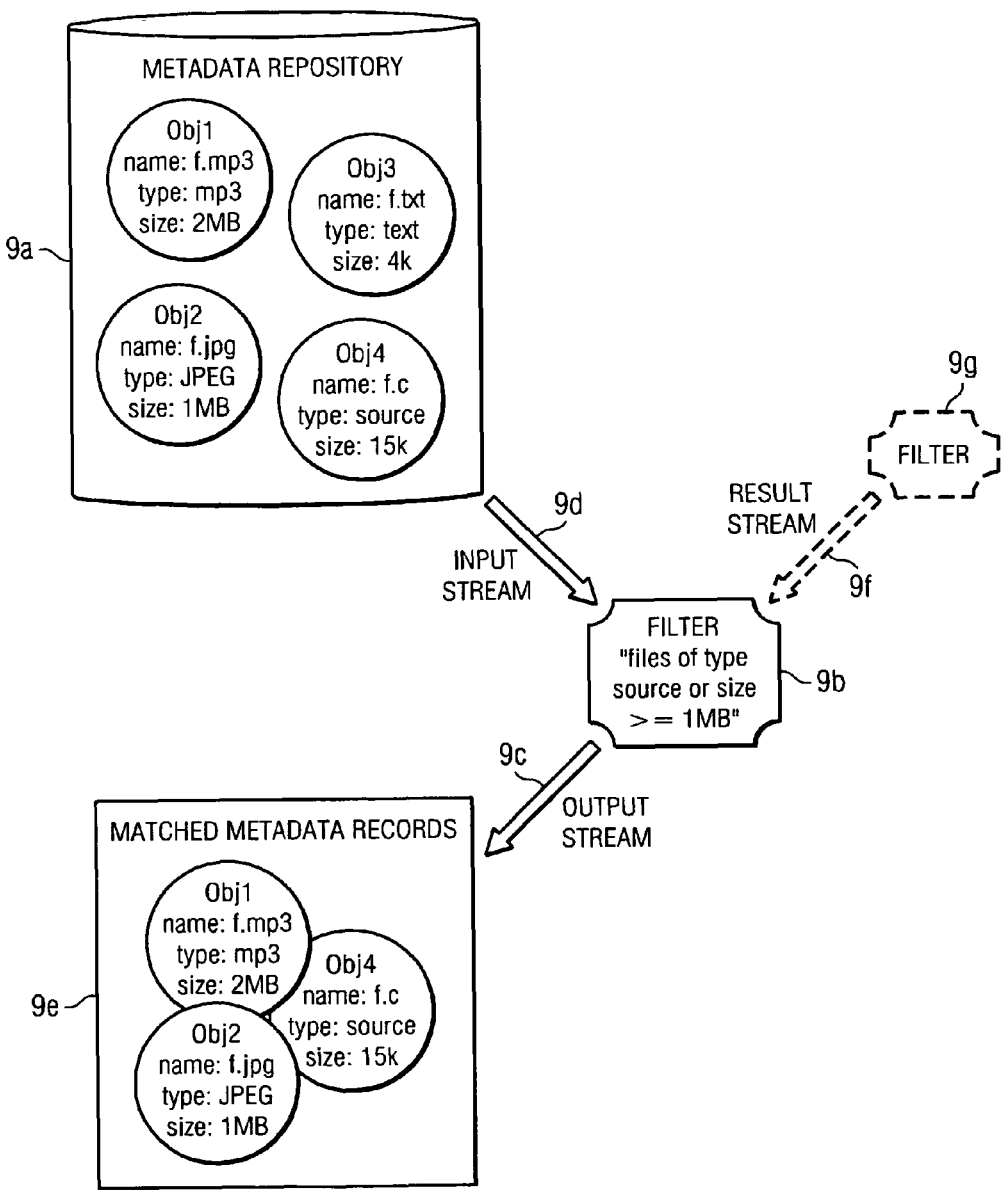

In one embodiment, the management device is configured with one or more filtering mechanisms that may trigger arbitrary actions which may change the state of managed storage(s). Exemplary actions may include, but not limited to, deleting files, compressing files, moving files, flagging files for backup, checking files into a document management system, indexing files for use in content search, etc. FIG. 9 is an abstract diagram depicting the operation of a single filter on a set of metadata records, each of which contains a set of attributes and values. It also depicts the operation of a "compound" filter on such a set, as would be obtained by "composing" multiple filters into a single filter. In FIG. 9, a metadata repository 9a containing "metadata records" for four managed objects (Obj1, Obj2, Obj3, Obj4) is depicted. A filter 9b is applied to metadata repository 9a and receives from metadata repository 9a an input stream 9d of metadata records referred to as "metadata events." Filter 9b may also receive a result stream 9f from another filter 9g as depicted in FIG. 9. Filter 9b contains a filter definition with filtering criteria which specify which records are to be selected. An output stream or result stream 9c from filter 9b contains all the metadata records 9e that match the specified filtering criteria from input stream 9a and optionally from result stream 9f.

Figure 10:
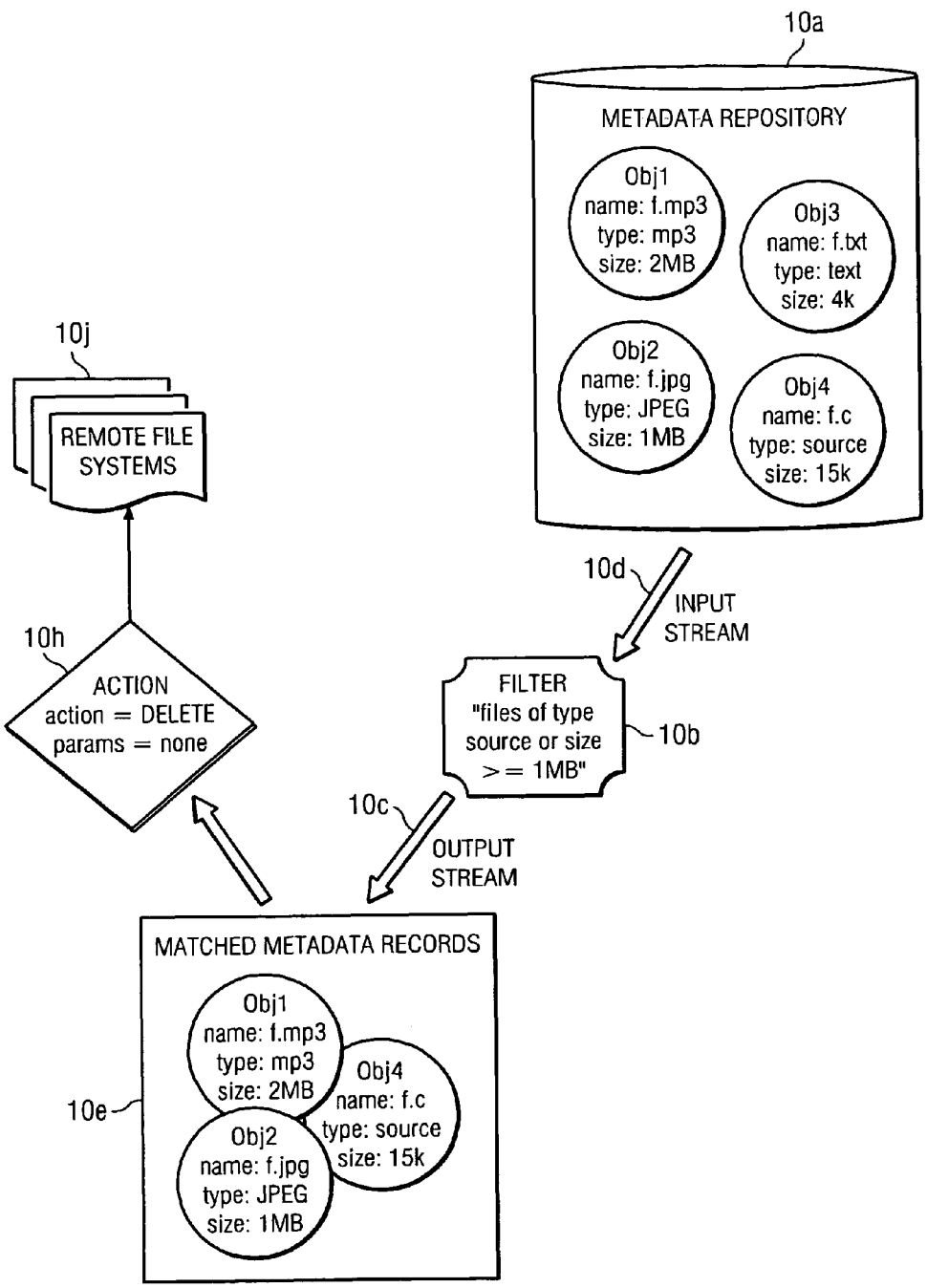

FIG. 10 depicts an action 10h reading matched metadata records 10e from an output stream 10c of a filter 10b operating on an input stream 10d of a metadata repository 10a as described above with reference to FIG. 9. Action 10h reads each metadata record and accordingly executes a specified action (in this case, "DELETE") with specified parameters (in this case, "none") against remote file system(s) 10j in which the managed objects (in this case, files Obj1, Obj2, Obj4) reside.

Figure 11:
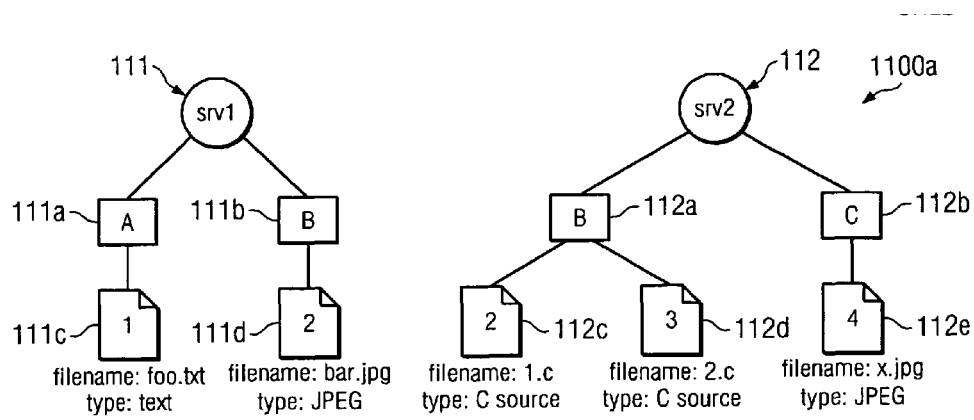
Figure 12:
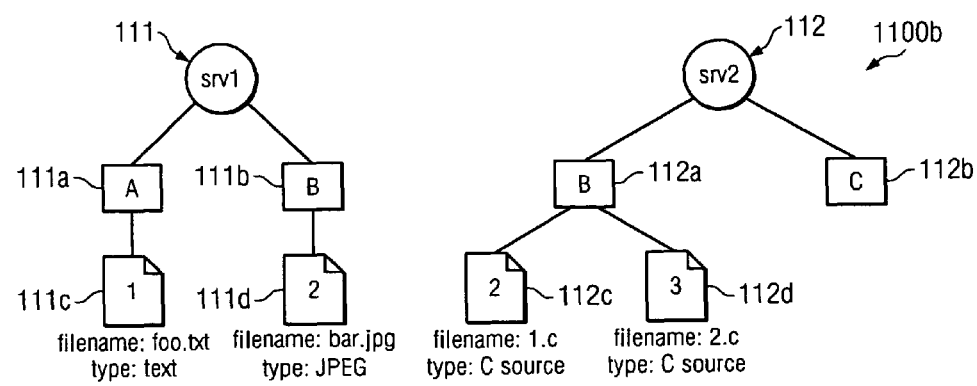

FIGS. 11-12 depict the structure and organization of a file system before (1100a) and after (1100b) the execution of a policy. According to embodiments of the invention, each policy is comprised of a condition and an action. The execution of a policy refers to taking a condition that conceptually lives in a repository, tying it to an action, and applying that action across managed objects (e.g. files, directories, other filesystem data etc.). By way of example, FIG. 11 depicts two "volumes" or independent file system directory trees srv1 111 and srv2 112. In this example, volume 111 contains two directories 111a, 111b named "A" and "B", respectively. Directory 111a contains a file 111c called "1". Directory 111b contains a file 111d called "2". Volume 112 contains two directories 112a, 112b named "B" and "C", respectively. Note that directory 112a, although it is named "B," it is different from and independent of directory 111b, which is also named "B" on volume 111. Directory 112a contains two files 112c, 112d called "2" and "3", respectively. Directory 111b contains one file 112e called "4".

FIG. 12 depicts the same file system described above with reference to FIG. 11 after the execution of a policy that has a filter specifying files from volume 112 of type JPEG with an action of "DELETE." In this case, file 112e, "4", which is on volume 112 and of type JPEG, is deleted from file system 1100b. It should be noted that filters specifying files to be acted on can be arbitrarily complex and may be composed together to produce new filters. Also note that the actions taken can be arbitrary; the notion here is to use harvested metadata stored in a metadata repository to drive actions taken against particular files.

Function (5): Providing a Workflow Model which Allows Human Users to be Included in the File Management Workflow.

As described above with reference to FIG. 8, one embodiment of the invention allows human users to be included in the file management workflow such that they may be prompted for their approval before any given action are taken to bring the managed storage into compliance with defined policies. This is not an easy task because, for example, a single end user may have multiple, different user identities across domains. To appropriately and consistently apply policy across one or more domains, each user 80n is given a single unified identity that is associated with zero or more corresponding domain identities (as will be described in more detail below).

One of ordinary skill in the art will recognize that it is possible to implement the above-described functions (1)-(5) in various ways without departing from the spirit and principle of the invention. To illustrate, another set of embodiments will now be described with reference to FIGS. 13-18.

As mentioned above, each file or directory in a computing environment (e.g., a corporate computer network) that implements embodiments of the invention is regarded as a managed object. Utilizing methods and systems disclosed herein, the metadata of all (potentially tens of millions to billions) of these "managed" files and directories can be collected, stored, maintained, accessed, and used to enforce and manage policies applicable to those files and directories. The range and scale of such a policy management capability afforded by embodiments of the present invention disclosed herein can be particularly useful in ensuring that all files and directories of an entity (e.g., a health care enterprise) are in compliance with applicable rules and regulations (e.g., HIPAA).

Figure 13:
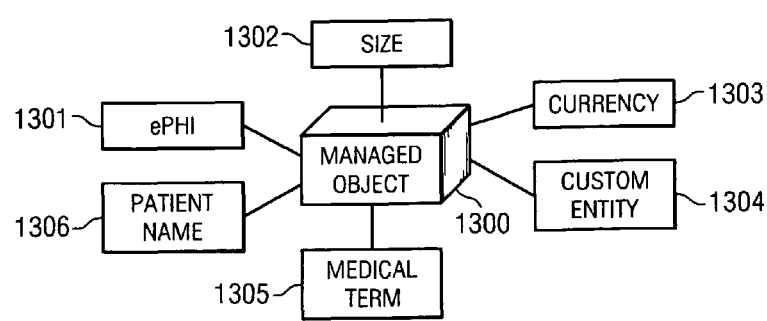
FIGS. 13-18 are schematic diagrams illustrating a second set of embodiments, in which FIG. 13 schematically shows an exemplary managed object having a plurality of metadata of various types, according to one embodiment of the invention, FIG. 14 schematically shows an exemplary metadata repository storing both dense and sparse attributes, according to one embodiment of the invention.

FIG. 13 schematically shows an exemplary managed object (in this case, a file 1300) with a plurality of metadata (in this case, attributes 1301-1306). As an artisan will appreciate, the number and types of attributes shown here are meant to be exemplary and not to be construed as limiting. In this example, attribute 1301 indicates that file 1300 contains electronic Protected Health Information (ePHI); attribute 1302 indicates the file size of file 1300; attribute 1303 indicates the age or "freshness" of file 1300; attribute 1304 indicates that file 1300 contains or is associated with certain custom entities, e.g., projects; attribute 1305 indicates that file 1300 contains or relates to a medical term; and attribute 1306 indicates that file 1300 is associated with a particular patient.

In embodiments of the invention, harvested metadata can encompass the full and unique (disjoint) semantics of each given file system protocol. As exemplified in FIG. 13, types of "harvested" metadata according to embodiments of the invention can include, but not limited to:

File system metadata, e.g., size 1302, currency 1303, etc. These are typical file system attributes from file systems and correlated application such as size, owner, various measurements of "age," and so on.

Content-based metadata, e.g., patient name 1306, medical term 1305, etc. These are content-specific entities within documents that can be described by the presence or absence of various keywords (or combinations of keywords), regular expressions, concepts, proximity, scope, and so on. A regular expression is a character sequence that is an abbreviated definition of a set of strings. A concept is described by a natural language entity (e.g., "Phil's Pharmacy"). Content-based metadata can be used to define entities in file classifications, each of which consists of one or more attributes and can be associated with one or more volumes.

Synthesized metadata. These may be mathematical checksums or hashes of file contents.

High-level "semantic" attributes, e.g., ePHI 1301, that serve to classify and categorize files and documents, useful for automating application of appropriate policies.

Other forms of metadata can also be used in conjunction with embodiments of the invention.

Figure 14:
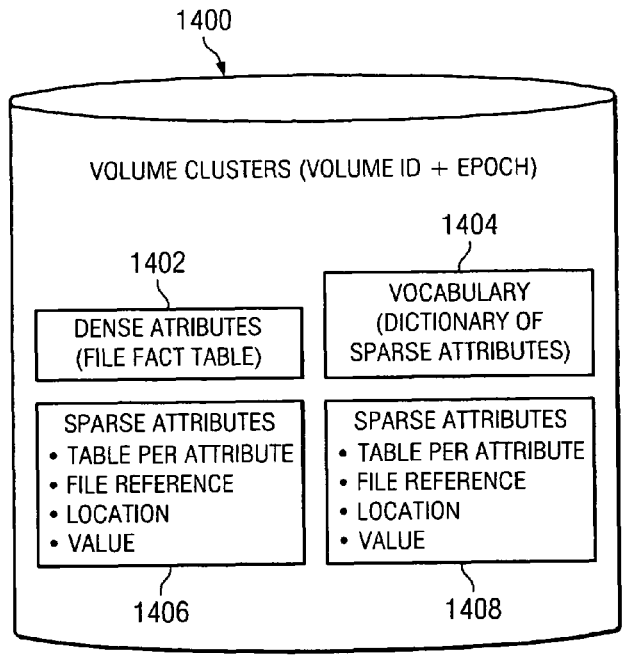

FIG. 14 depicts an exemplary metadata repository 1400 for storing various types of metadata of "managed" files and directories. In this example, metadata repository 1400 contains four volume clusters 1402, 1404, 1406, 1408, each of which stores a set of dense attributes, a set of sparse attributes, or a dictionary thereof. Metadata repository 1400 is configured to store both dense and sparse attributes of all managed files and directories. Dense attributes are attributes that are common to all managed objects, e.g., file system metadata. Sparse attributes are attributes that may be uncommon or even unique to a single object, e.g., attribute tables, file reference, location, value, etc.

Figure 15:
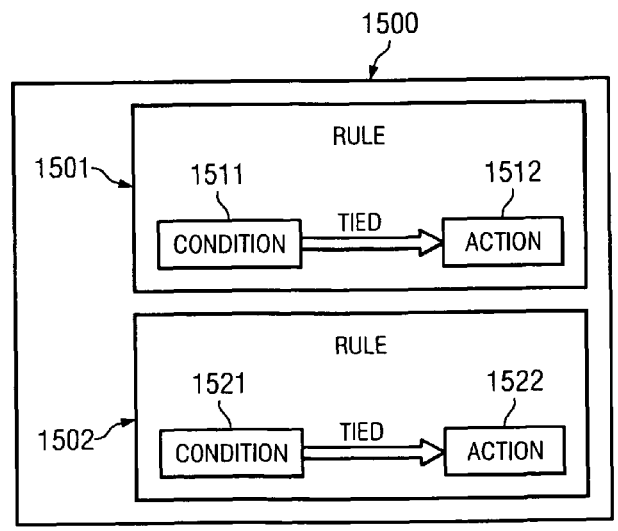

According to embodiments of the invention, policies can be expressed in terms of conditions and actions and conditions conceptually living in a repository can be expressed in terms of metadata. Thus, actions on managed objects (files and directories) may be tied to conditions through metadata, as illustrated in FIG. 15. In the example shown in FIG. 15, a policy 1500 may have a plurality of rules such as rules 1501, 1502. Each rule may require a certain action or actions to be taken if and when a certain condition is met. As such, rule 1501 may require action 1512 if condition 1511 is present. Similarly, rule 1502 may require action 1522 when condition 1521 occurs. For example, assuming that a new regulation creates a condition in which all patient records are now considered "protected health information." To comply with this new regulation, actions must be taken to protect files containing patient records. Utilizing embodiments of the systems and methods disclosed herein, an end user can define and execute a new policy that complies with the new regulation in a timely and efficient manner. For example, a user can define a policy that ties the condition (i.e., electronic patient records are protected health information) to an appropriate action (e.g., move files having a metadata "ePHI" on a volume "Public" to a secure volume "Private"). This new policy can be automatically applied to all managed objects across file systems of a managed enterprise platform.

Figure 16:
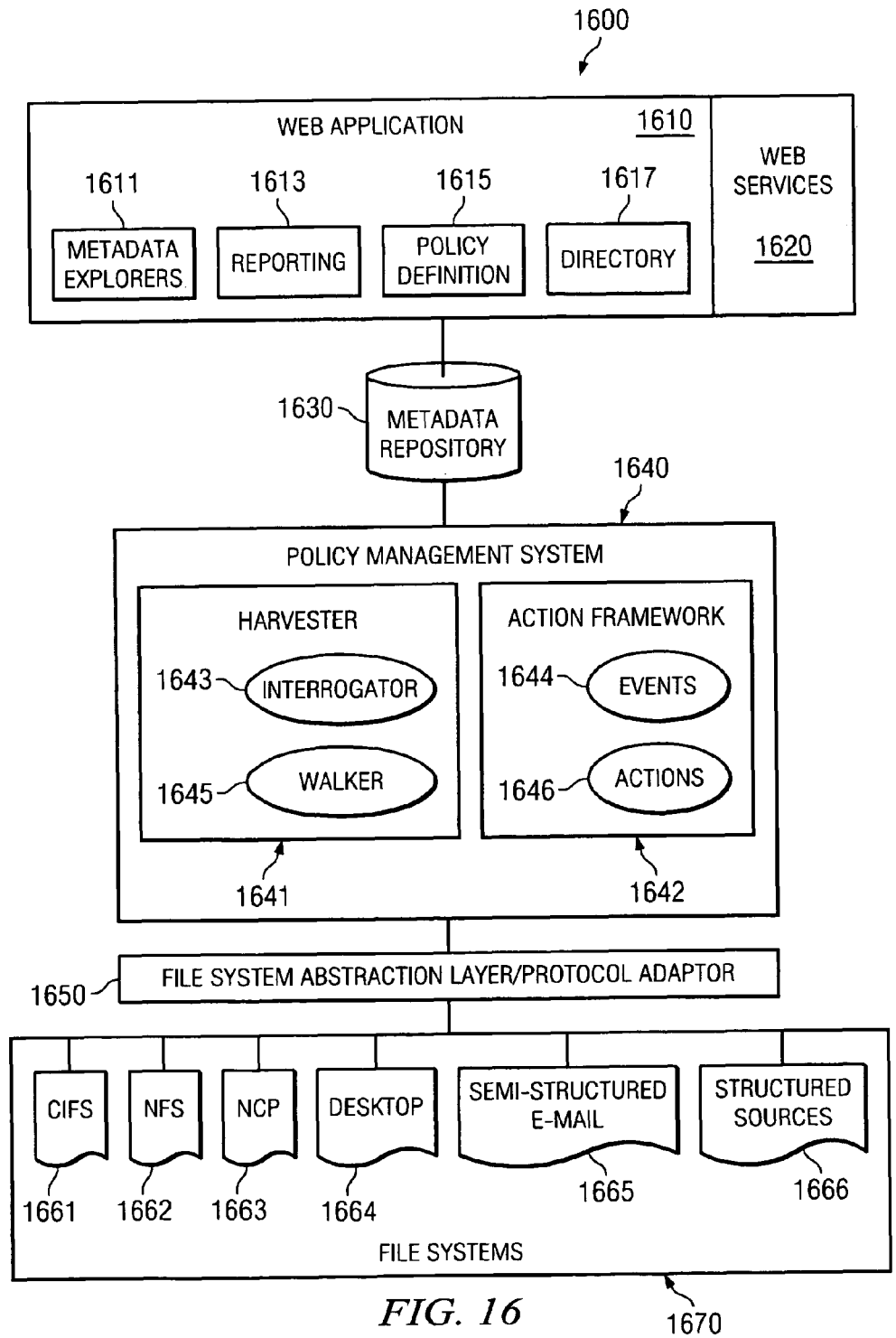

FIG. 16 depicts a platform 1600, which is also referred to as the policy director platform. In this example, platform 1600 comprises a Web application 1610 and conventional Web services 1620. Web application 1610 includes a user interface that operates to provide a plurality of functionalities such as metadata explorers 1611, reporting 1613, policy definition 1615, and directory 1617 that enable end user(s) to, for example, harvest and browse metadata, generate reports, define and execute policies, access and browse volumes, etc.

Platform 1600 further comprises a metadata repository 1630 and a policy management system 1640. Similar to metadata repository 50f and metadata repository 1400 described above with reference to FIGS. 5 and 14, respectively, metadata repository 1630 stores harvested metadata of all managed objects (files and directories) of file systems 1670. In the example shown in FIG. 16, policy management system 1640 comprises a harvester 1641 and an action framework 1642.

In this embodiment, action framework 1642 comprises a first component (events) 1644 and a second component (actions) 1646. Events 1644 provides typical event monitoring and routing functions and operates to assert events triggered by the generation of a new policy, which may include one or more policy rules, as well as changes made to an existing policy or policies. Actions 1646 comprises a plurality of subcomponents configured to perform various functions (e.g., transaction management, action routing, action adapter, etc.) and a plurality of actions (e.g., move, migrate, copy, delete, secure, notify, etc.) These actions are programmable. For example, each action can be programmed to perform under a certain specified condition to satisfy one or more policy rules. Each action can also be programmed to perform at a certain specified time or upon the assertion or occurrence of a certain event.

Harvester 1641 shown in FIG. 16 is configured to perform a plurality of functions similarly to those of harvester 50 described above with reference to FIG. 5. In this embodiment, harvester 1641 may comprise a first component (walker) 1645 and a second component (interrogator) 1643. Walker 1645 is configured to interact with a file system abstraction layer/protocol adaptor 1650 so that walker 1645 can conduct file acquisition on managed objects (files and directories) across file systems 1670 that operate under various file system protocols, much like "walking" around file systems 1670 to find out what files and directories need to be acted upon. In one embodiment, walker 1645 operates to locate managed objects that need to be classified, e.g., through an object classification engine.

Figure 18:
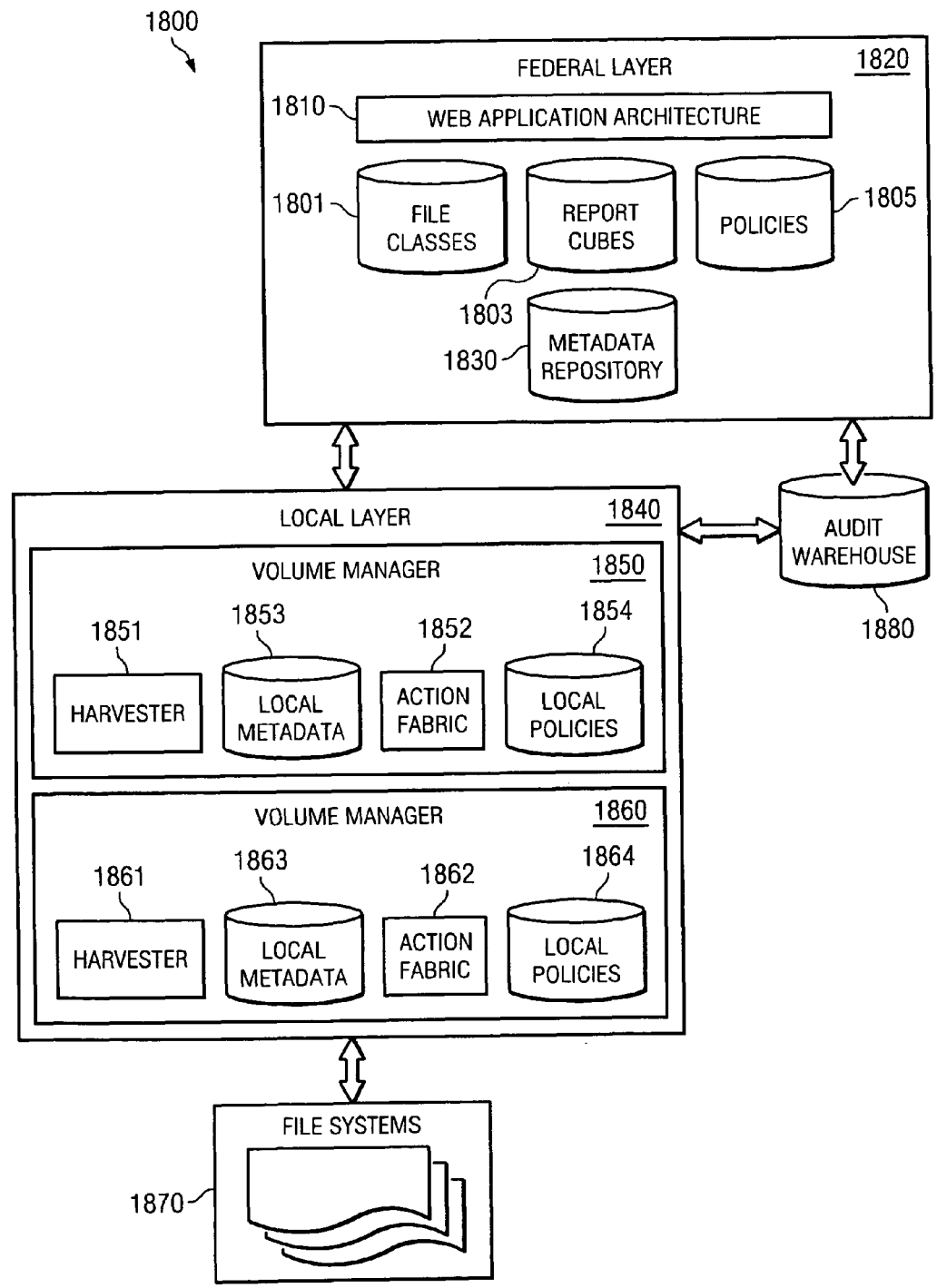

In this embodiment, file system abstraction layer/protocol adaptor 1650 can be seen as an integrated component that functions similar to file system abstraction layer 80e and file system protocol adaptor 80d described above with reference to FIG. 8. File systems 1670 might be operating respectively in accordance with a variety of file system protocols, for example, common internet file system (CIFS) 1661, Network File System (NFS) 1662, NetWare Core Protocol (NCP) 1663, desktop(s) 1664, semi-structured e-mail(s) 1665, structured sources 1666, etc. Walker 1645 can be configured to perform file acquisition on these files and directories in scheduled batches, automatically upon the occurrence of a certain file system event (e.g., grouping a set of volumes, archiving a volume, etc.), or in response to a user request (e.g., "get metadata on Volume X") from metadata explorers 1611 of Web application 1610. In this embodiment, walker 1645 is configured to perform file acquisition only and interrogator 1643 is configured to handle the majority of the metadata harvesting process at the system level (e.g., system metadata extraction, security extraction, directory mapping, etc.) as well as at the content level (e.g., text conversion, duplication computation, keyword extraction, raw entity extraction, text pattern extraction, filtering/scoping, proximity analysis, user level entity assertion, etc.). In this case, interrogator 1643 may also be configured to perform object classification. The grouping of these subcomponents of harvester 1641 is not limited to what is shown in FIG. 16. Furthermore, the functionality of harvester 1641 can be distributed, as shown in FIG. 18.

Figure 17:
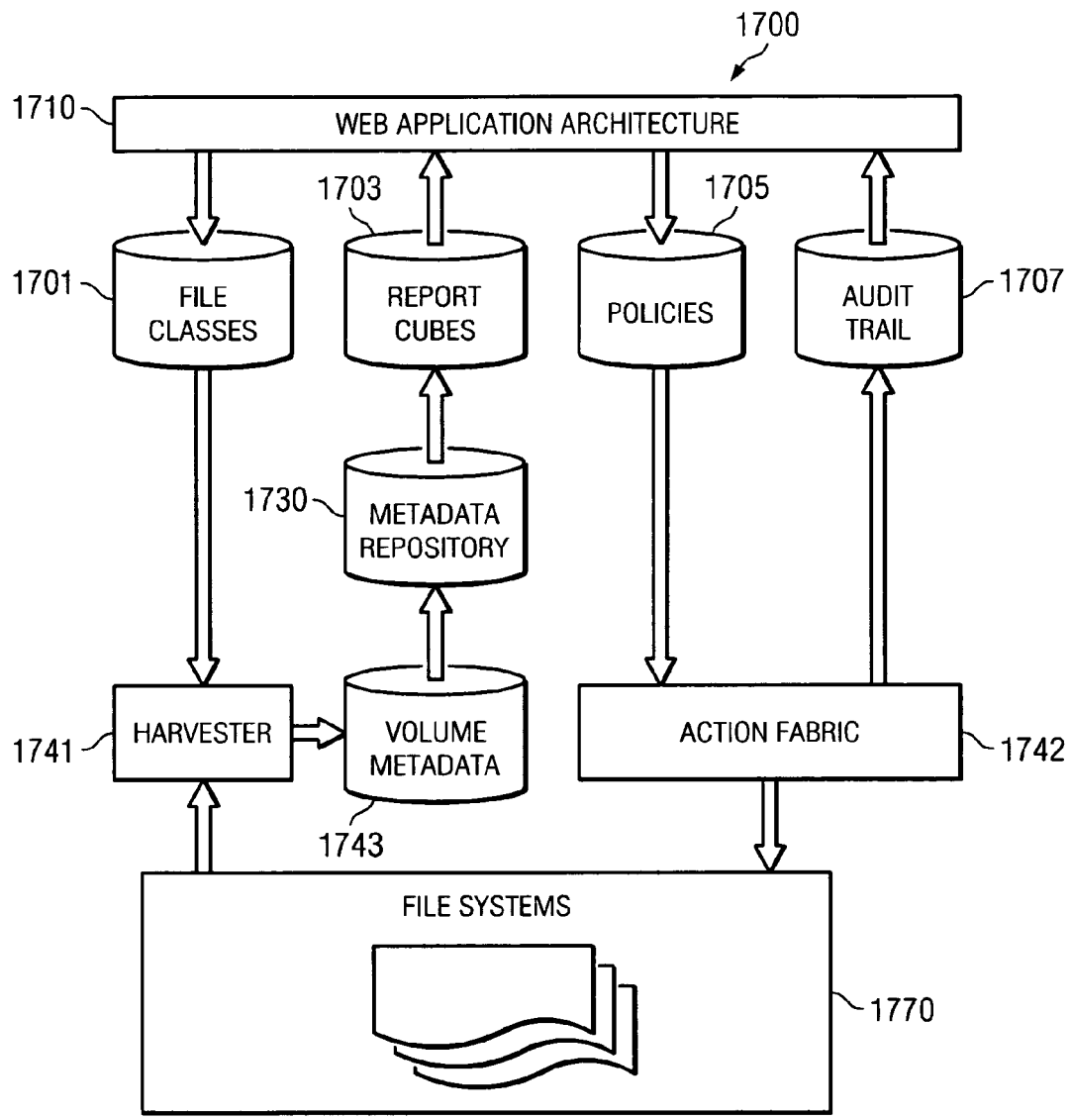

FIG. 17 is a block diagram illustrating a high level architectural view of a system platform 1700 and interactions among its various components. As exemplified in FIG. 17, through Web application architecture 1710, which is similar to Web application architecture 1610 described above with reference to FIG. 16, users with sufficient administrative privileges and/or security clearance can perform a variety of tasks and activities, for example, harvest metadata from managed objects (i.e., files and directories), take actions (e.g., move, delete, etc.) on managed objects, define/update policies and associated rules, group/manage volumes, schedule/view tasks (or "jobs"), and so on. These user tasks and activities are supported by a plurality of components including file classes 1701, report cubes 1703, policies 1705, and audit trail 1707.

In this embodiment, file classes 1701 serves as a container of file classes, each of which consists of one or more metadata. Report cubes 1703 serves as a container storing metadata that are pulled out from metadata repository 1730 as views or snapshots of certain metadata records, such as those described above with reference to FIG. 7. Policies 1705 serves as a container storing, for example, corporate policies specified by an authorized user or users via Web application architecture 1710. Audit trail component 1707 allows users to, among others, 1) audit the trail of a policy execution as applied to all managed objects of an enterprise in a comprehensive, timely manner; 2) audit the trail of a single file to investigate its history, which can be independent to any policy application/execution; and 3) audit the trail of a harvesting process to investigate, for example, how many and what metadata of how many and what files had been harvested and when.

In this example, action fabric 1742 is configured to perform a plurality of functions similar to those of action framework 1642 described above with reference to FIG. 16. That is, action fabric 1742 provides a plurality of programmable actions which can be applied to all managed objects (files and directories) of file systems 1770, which is similar to file systems 1670 described above with reference to FIG. 16, in compliance with one or more policy rules specified in policies 1705. As described above, actions can be taken in scheduled batches or triggered by events. All actions taken by action fabric 1742 are traceable by audit trail component 1707.

As shown in FIG. 17, in one embodiment, platform 1700 further includes a volume metadata 1743 which serves as a data warehouse storing classified metadata from harvester 1741 for faster, optimized access by metadata repository 1730, which is similar to metadata repository 1630 described above with reference to FIG. 16. Data warehousing can distribute control over information for decision making in an enterprise. In one embodiment, harvester 1741, which is similar to harvester 1641 described above with reference to FIG. 16, could include an object classification rules engine (not shown) that is configured to classify metadata based on file classes contained in file classes 1701.

FIG. 18 is a block diagram illustrating a federated architecture 1800, according to one embodiment of the invention. In this example, the policy management functionality provided by platform 1700 described above is divided into a federal layer 1820 and a local layer 1840, forming a distributed system that is built on top of a plurality of local systems. Federal layer 1820 may be implemented in a computer system or appliance.

In this embodiment, federal layer comprises a plurality of components including Web application architecture 1810, file classes 1801, report cubes 1803, policies 1805, and metadata repository 1830. These "federal" components are similar to Web application architecture 1710, file classes 1701, report cubes 1703, policies 1705, and metadata repository 1730 described above with reference to FIG. 17. Federal layer 1820 may be implemented in a computer system or appliance. Federal layer 1820 can be configured to support global operations such as replication and migration.

In this embodiment, local layer 1840 comprises one or more local systems, which can simultaneously function as stand-alone systems or as part of a federated file system. In FIG. 18, local layer 1840 is responsible for performing local policy management functions/operations on, for example, a first local volume and a second local volume of file systems 1870, as directed by federal layer 1820. Two local systems, referred to as volume manager 1850 and volume manager 1860, are configured to perform policy management functions and/or operations on the first local volume and the second local volume, respectively. Volume manage 1850 comprises a plurality of components such as harvester 1851, local metadata 1853, action fabric 1852, and local policies 1854. Similarly, volume manager 1860 comprises a plurality of components such as harvester 1861, local metadata 1863, action fabric 1862, and local policies 1864. These "local" components are similar to harvester 1741, volume metadata 1743, action fabric 1742, and policies 1705 described above with reference to FIG. 17. Historical data, i.e., histories of tasks and activities performed by local systems (e.g., volume manager 1850 and volume manager 1860), are retained in audit warehouse 1880 and made accessible to users via Web application architecture 1810 at federal layer 1820.

As described above, network file system protocols generally are not interoperable, which imposes many challenges in enforcing document workflow and retention policies in, for example, a corporate environment. Moreover, because file systems are quasi-hierarchical collections of directories and files, the notion of "triggers" and "stored procedures" are not available to file systems to ensure data correctness and integrity and to automate certain administrative and application-specific tasks. Embodiments of the invention described herein provide viable mechanisms that can address these challenges and configure a file system or systems to allow only particular content types or otherwise make decisions about what should be stored, where, and how, thereby facilitating intelligent and efficient policy management at an enterprise level, reducing business risks, ensuring regulation compliance, and promoting sensible, timely, and manageable control over vast electronic information.

To facilitate these management operations, embodiments of the invention may allow human users to be included in the object management workflow such that they may be prompted for their approval before any given actions are taken to bring objects within the managed storage into compliance with defined policies. This is not an easy task because, for example, a single end user may have multiple, different user identities across domains or filessytems. To appropriately and consistently apply policy across one or more domains, each user may be given a single enterprise wide user identity that is associated with zero or more corresponding domain or filesystem identities.

Attention is now directed to systems and methods for identifying objects in a managed storage environment with a user and involving the user with policy implementations or decisions associated with these files or objects. These systems and methods may allow a single user identity for the managed storage environment (i.e. enterprise wide user identification) to be assigned to a user and associated with a set of user identities, each of the set of user identities corresponding to the user's identity with respect to a particular domain, (e.g. filessystem or filesystem type). Previous or subsequent to establishing a user's enterprise wide identity, data and metadata may be obtained about objects residing in one or more of the domains in the enterprise as described in detail above. Objects within these domains can then be associated with a user using the set of user identities and a report generated for the user based upon these objects, including the policies associated with these objects.

Figure 19:
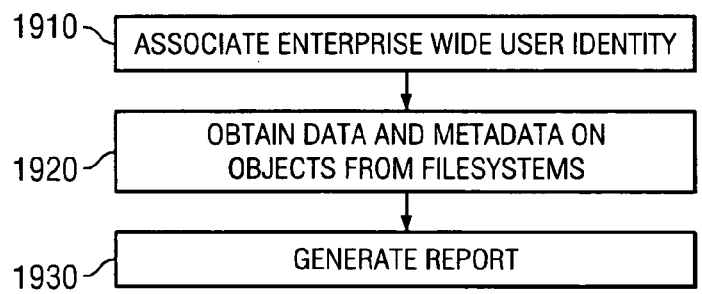
FIG. 19 is a flow diagram of one embodiment for a method of involving users in object management.

Turning to FIG. 19 a flow diagram for one embodiment of a method of the present invention for identifying objects in a managed storage environment with a user and involving a user with policy implementations or decisions associated with these objects is depicted. At step 1910 an enterprise wide user identity may be associated with a set of user identities. Each of the set of user identities may be a user identity associated with one or more of the domains or filessytems in a managed storage environment. Previous or subsequent to establishing a user's enterprise wide identity at step 1910, data and metadata on objects may be obtained from one or more of the domains in the enterprise, as described above, at step 1920. A user report may then be generated at step 1930.

Figure 20:
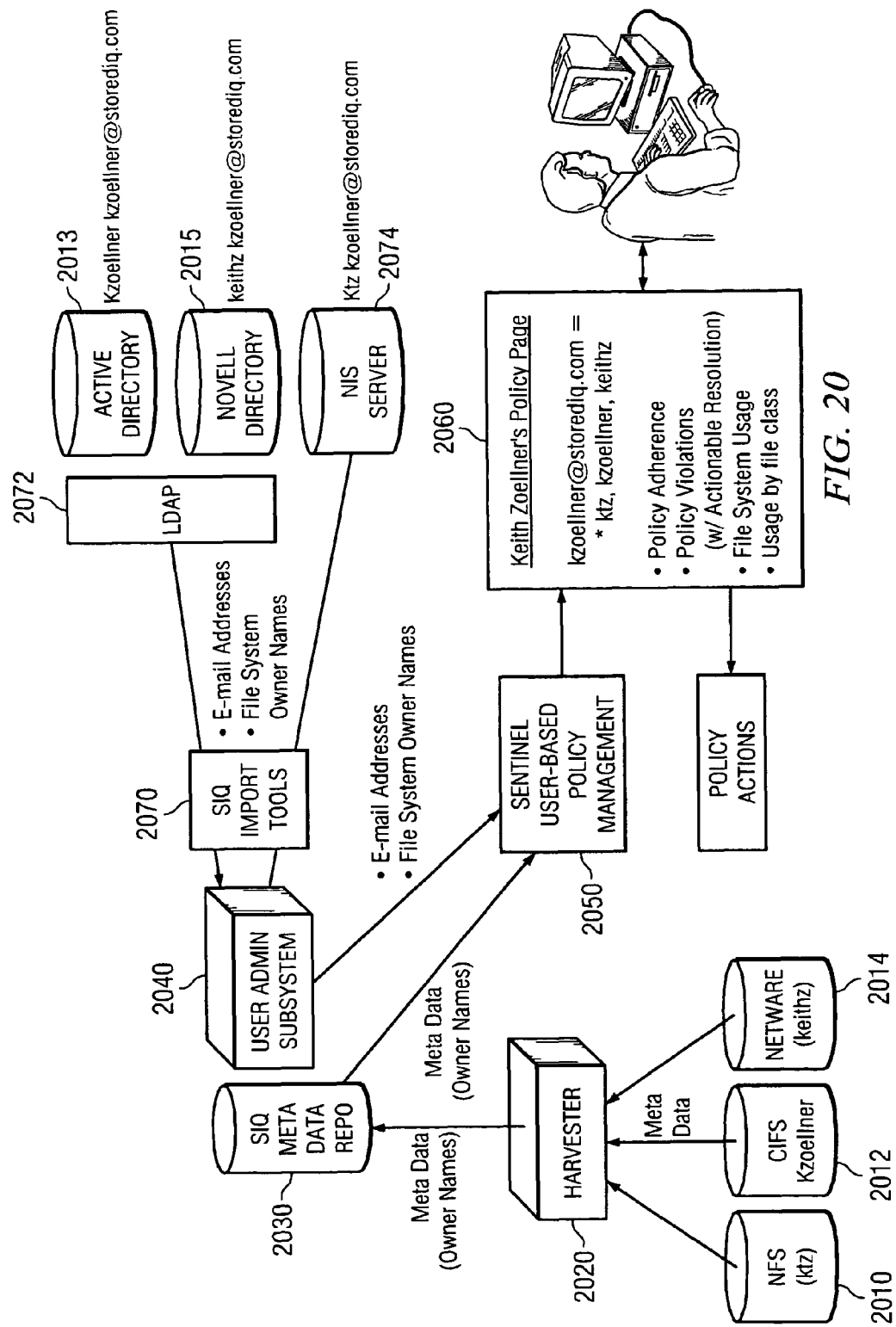
FIG. 20 depicts an exemplary architecture for implementing methodologies for involving users in object management.

Embodiments of the method of the present invention depicted in FIG. 19 may be explained more easily with reference to an exemplary architecture for the implementation of such methods. FIG. 20 depicts one embodiment of just such an exemplary architecture. Managed storage may comprise filesystems 2010, 2012, 2014 each may be of a different type. For example, filesystem 2010 may be an NFS filesystem, filesystem 2012 may be a CIFS filesystem while filesystem 2014 may be a Netware filesytem. Harvester 2020 may be operable to extract data and metadata associated with objects from each of filesystem 2010, 2012 and 2014 and place it in metadata repository 2030, as described above. User administration subsystem 2040 may be operable to allow an enterprise wide user identification to be associated with a set of user identifications, and may be employed to implement user-based policy management 2050, which in turn may be used to generate a report 2060 for a user. In one embodiment, user administration subsystem 2040 and user-based policy management 2050 may be parts of web application 1610 (as depicted in FIG. 16).

Figure 21:
FIGS. 21 and 22 depict embodiments of various exemplary interfaces.
Figure 22:
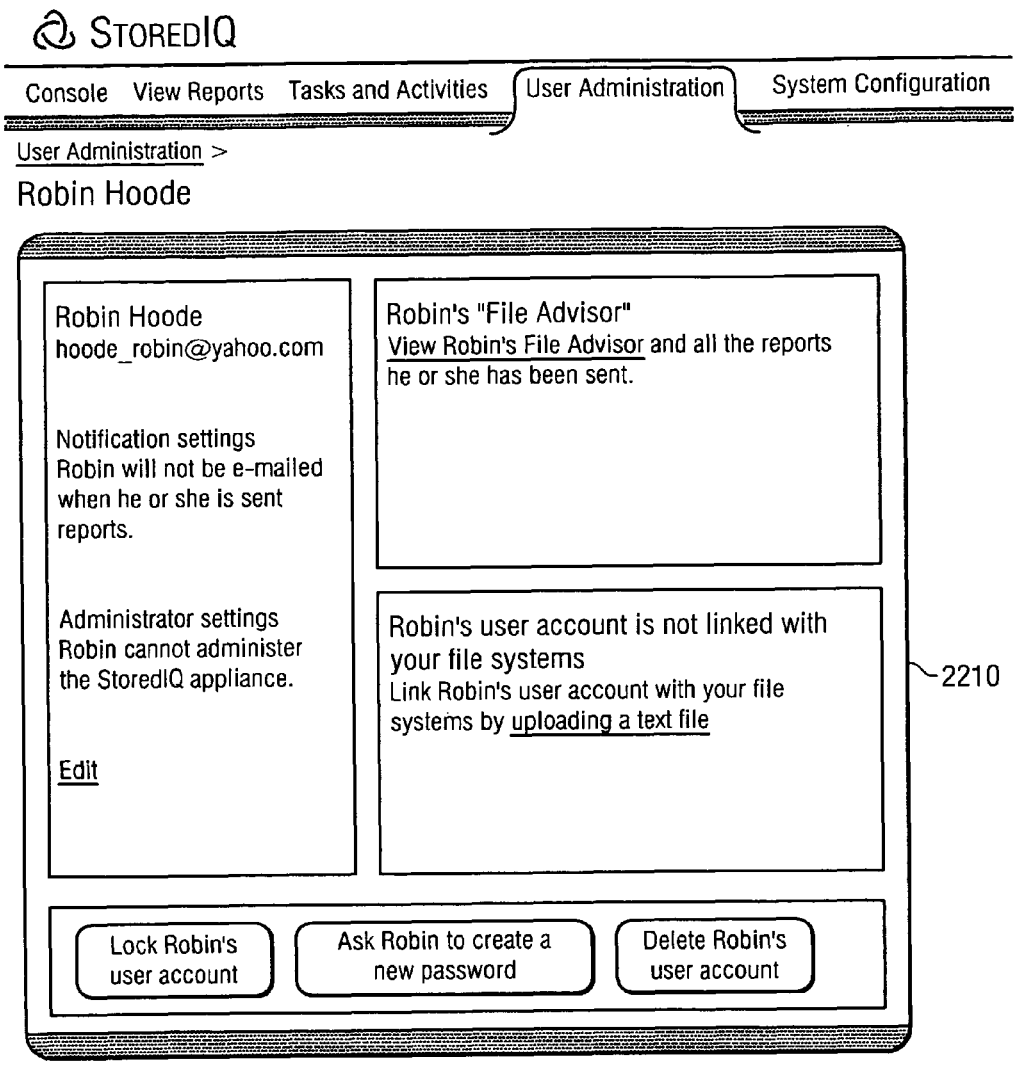

User administration subsystem 2040 may provide a set of interfaces to allow an enterprise wide user identification to be defined and associated with a set of user identifications more easily. Turning to FIGS. 21 and 22, one embodiment of a series of interfaces which may be presented to an administrator to allow the definition of an enterprise wide user identification and the association of one or more user identifications with that enterprise wide user identification are depicted.

FIG. 21 depicts screen 2110 which allows an administrator to enter the first and last names of a user and an email address. This email address may be unique to the user, serve as their enterprise wide identification and allow notifications, reports and other information to be sent to the user at this email address. Once this information has been entered a summary screen may be presented to an administrator by user administrator subsystem 2040.

FIG. 22 depicts one embodiment of a screen which may be displayed to an administrator and which presents a summary of the information pertaining to a particular user. Screen 2210 presents a summary of the information associated with a user named "Robin Hoode". Notice that enterprise wide identification of the user named "Robin Hoode" is "hoode_robin@yahoo.com" in this case. Screen 2210 also presents domain or filessytem information associated with the user. This may include a set of user identifications where each of the set of user identities may be a user identity associated with one or more of the domains or filessytems in managed storage. Additionally, screen 2210 may allow an administrator to associate the enterprise wide user identification with one or more user identities where each user identity is associated with one or more of the domains or filessytems in the managed storage.

Returning to FIG. 20, in one embodiment, associating an enterprise wide user identification with user identities corresponding to different filesystems or domains may be accomplished using import tools 2070. These import tools 2070 may allow a file to be uploaded which contains a set of user identities and, associated with each of the user identities, a particular domain, filesystem or type of filesystem. In certain embodiments, import tools 2070 may obtain the user identities by accessing a Lightweight Directory Access Protocol (LDAP) server 2072 which may contain user identities associated with a particular filesystem 2010, 2012, 2014. Import tools 2070 may also be operable to obtain user identities directly from filesystems 2010, 2012, 2014 themselves, including those filesystems which utilizes active directory structure 2013 such as CIFS filesystem 2012, or a Novell directory structure 2015 such as Netware filesytem 2014, among myriad others. Import tools may also be operable to access Network Information Services (NIS) server 2074 to obtain user identifications for filesystems such as NFS filesystem 2010. It will be apparent that many additional methodologies for obtaining user identities associated with filesystems 2010, 2012, 2014 may be utilized in conjunction with embodiments of the systems and methods of the present invention. Notice that in the example depicted in FIG. 20 the user identity "kzoellner" is associated with CIFS filesystem 2012, user identity "keithz" is associated with Netware filesystem 2014, and user identity "ktz" is associated with NFS filesystem 2010. Additionally note that the set of user identities ("keithz", "kzoellner" and "ktz") associated with various filesystems 2010, 2012, 2014 are, in turn, associated with enterprise wide user identification "kzoellner@storediq.com".

Referring briefly to FIG. 19, either before or after an enterprise wide user identification is associated with domain user identities at step 1910, data or metadata on objects in filesystems 2010, 2012, 2014 may be obtained from one or more of the filesystems 2010, 2012, 2014 in the managed storage at step 1920 and stored in metadata repository 2030, as discussed above. Metadata repository 2030 may store this data and metadata as records, each record linking a set of attributes to an object in one of the filesystems 2010, 2012, 2014. These attributes may include a user identification associated with objects on which metadata or data is stored in metadata repository 2030, as discussed above.

Using the information stored in metadata repository 2030 a report may be generated for a user at step 1930. In one embodiment, user based policy management subsystem 2050 may generate a report associated with a particular enterprise wide identification. In particular, user based policy management subsystem 2050 may use the set of user identifications associated with an enterprise wide user identification to identify objects in metadata repository 2030 by comparing the user identification associated with an object in metadata repository 2030 with the set of user identifications associated with the enterprise wide user identification.

Based on the set of objects found in metadata repository 2030 associated with the set of user identities corresponding to an enterprise wide user identity, report 2060 may be generated at step 1930. This report 2060 may include information on the policies adhered to by the user associated with the enterprise wide user identification, policy violations of the user associated with enterprise wide user identification, usage of filesystems 2010, 2012, 2014 by the user associated with enterprise wide user identification, usage broken down by file class etc. In fact, the objects associated with the enterprise wide user identity may be grouped, organized, filtered, sorted or reported according to almost any criteria.

In one embodiment, report 2060 may be generated in Hyper Text Markup Language (HTML) and sent to an email address associated with the enterprise wide user identification (which in one particular embodiment may be identical). This HTML document may contain a set of links associated with various information corresponding to the report which the user may access using one or more of the set of links. Some of the HTML links may pertain to actions that the user may take with regards to policy violations which the user may have committed. Thus, by accessing or "clicking" on these links these users may able to accomplish actions pertaining to these policy violations. Similarly, links may allow a user to access a locations or applications where these actions may be accomplished. These actions may be particular to the policy with which they are associated, and may include actions such as deleting the file, moving the file etc.

FIGS. 23A-C depicts one embodiment of just such a report which may be sent to a user. Notice that the report of FIGS. 23A-C may be in HTML and brought up in a web browser of the type known in the art. Also notice that the report sent to a user may include breakdowns on the sizes of files which associated with the user, the type of files owned by the user, files which are duplicates etc. Also notice that the report may comprise links to various data or applications concerning the usage of the various filesystems by the user, or actions that the user may take regarding the user's objects.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for involving a human user in object management, comprising:
    enabling an administrator of an enterprise to define an enterprise wide user identity for the human user;
    obtaining a set of user identities of the human user associated with a set of filesystems;
    associating the enterprise wide user identity of the human user with the set of user identities of the human user, wherein each of the set of user identities of the human user is associated with one of the set of filesystems;
    before or after the associating step, extracting data and metadata associated with objects from the set of filesystems, wherein the objects include files and directories and extracting the metadata comprises:
    collecting raw metadata of the files and directories,
    filtering the raw metadata,
    synthesizing synthetic metadata from the filtered raw metadata, and
    generating content-based metadata wherein generating content-based metadata for a file comprises processing content of the file according to a type of the file to determine one or more content-specific entities within the file;
    storing the data and metadata in a metadata repository as records, each record linking a set of attributes to an object in one of the set of filesystems, wherein the set of attributes includes information identifying an owner of the object;
    locating a set of records for the human user within the metadata repository using one or more of the set of user identities of the human user, wherein the human user is an owner of each of the objects corresponding to each of the set of records; and
    generating a report specific to the human user based on the set of records for the human user, wherein the report includes information on adherence to enterprise policies only by the human user associated with the enterprise wide user identity in conjunction with each of the objects corresponding to each of the set of records for the human user and excluding other human users of the enterprise from the report.

2. The method of claim 1, wherein locating a record within the set of records comprises comparing a user identification associated with the record to the set of user identities.

3. The method of claim 1 further comprising providing the report to the human user.

4. The method of claim 3, wherein the report is provided to the human user via email.

5. The method of claim 1, wherein the report contains a set of policy violations by the human user.

6. The method of claim 5, wherein one or more of the set of policy violations is associated with an action by the human user.

7. The method of claim 6, wherein the report is an HTML document.

8. The method of claim 7, wherein the action includes using an HTML link.

9. The method of claim 8, wherein the HTML link is associated with an application.

10. The method of claim 4, wherein the report to the human user using an email address associated with the enterprise wide user identity.

11. The method of claim 1, wherein obtaining the set of user identities of the human user associated with the set of filesystems in the managed storage of the enterprise further comprises accessing the set of filesystems, an LDAP server, an NIS server or an active directory.

12. The method of claim 10, wherein the email address is identical to the enterprise wide user identity of the human user as defined by an administrator.

13. A computer-readable storage medium having instructions embodied thereon, the instructions translatable for:
    associating an enterprise wide user identity of a human user with a set of user identities of the human user, wherein each of the set of user identities is associated with one of a set of filesystems;
    extracting data and metadata associated with objects from the set of filesystems, wherein the objects include files and directories and extracting the metadata comprises:
    collecting raw metadata of the files and directories,
    filtering the raw metadata,
    synthesizing synthetic metadata from the filtered raw metadata, and
    generating content-based metadata wherein generating content-based metadata for a file comprises processing content of the file according to a type of the file to determine one or more content-specific entities within the file;
    storing the data and metadata in a metadata repository as records, each record linking a set of attributes to an object in one of the set of filesystems, wherein the set of attributes includes information identifying an owner of the object;
    locating a set of records for the human user within the metadata repository using one or more of the set of user identities of the human user, wherein the human user is an owner of each of the objects corresponding to each of the set of records; and
    generating a report specific to the human user based on the set of records for the human user, wherein the report includes information on adherence to enterprise policies only by the human user associated with the enterprise wide user identity in conjunction with each of the objects corresponding to each of the set of records for the human user and excluding other human users of the enterprise from the report.

14. The computer readable storage medium of claim 13, wherein locating a record within the set of records comprises comparing a user identification associated with the record to the set of user identities.

15. The computer readable storage medium of claim 13, the instructions further translatable for providing the report to the human user.

16. The computer readable storage medium of claim 15, wherein the report is provided to the human user via email.

17. The computer readable storage medium of claim 13, wherein the report contains a set of policy violations by the human user.

18. The computer readable storage medium of claim 17, wherein one or more of the set of policy violations is associated with an action by the human user.

19. The computer readable storage medium of claim 18, wherein the report is an HTML document.

20. The computer readable storage medium of claim 19, wherein the action includes using an HTML link.

21. The computer readable storage medium of claim 20, wherein the HTML link is associated with an application.

22. The computer readable storage medium of claim 13, the instructions further translatable for determining each of the set of user identities of the human user.

23. The computer readable storage medium of claim 22, wherein the set of user identities of the human user are determined using an LDAP server, an NIS server or an active directory.

24. The computer readable storage medium of claim 22, wherein the enterprise wide user identity of the human user is defined by an administrator.

25. A method for involving a human user in object management, comprising:
associating an enterprise wide user identity of the human user with a set of user identities of the human user, wherein each of the set of user identities of the human user is associated with one of a set of filesystems;
locating a set of records for the human user within a metadata repository by comparing a user identification associated with each of the set of records to one or more of the set of user identities, wherein each record is associated with an object in one of the set of filesystems and contains information identifying an owner of the object, the human user is an owner of each of the objects corresponding to each of the set of records, and wherein the each record includes metadata on the associated object, the associated object comprising a file or a directory and the metadata is extracted by:
collecting raw metadata of the object,
filtering the raw metadata,
synthesizing synthetic metadata from the filtered raw metadata, and
generating content-based metadata wherein generating content-based metadata for a file comprises processing content of the file according to a type of the file to determine one or more content-specific entities within the file;
generating a report specific to the human user based on the set of records for the human user, wherein the report is an HTML document containing a set of links associated with information on adherence to enterprise policies only by the human user associated with the enterprise wide user identity in conjunction with each of the objects corresponding to each of the set of records for the human user and excluding other human users of the enterprise from the report; and
providing the report to the human user.

26. A method for managing network file system objects, comprising:
gathering metadata on managed objects across network file systems, wherein each managed object of said managed objects is associated with a user identity, each managed object comprises a file or a directory and the metadata is gathered by:
collecting raw metadata of object,
filtering the raw metadata,
synthesizing synthetic metadata from the filtered raw metadata and
generating content-based metadata wherein generating content-based metadata for a file comprises processing content of the file according to a type of the file to determine one or more content-specific entities within the file;
storing said metadata in a metadata repository as records, each record linking a set of attributes to a managed object per the user identity associated therewith;
associating an enterprise wide user identity of a human user with a set of user identities of said human user;
locating a set of said metadata records for the human user within said metadata repository using one or more user identities of said set of user identities of said human user, wherein the human user is an owner of each of the managed objects corresponding to each of the set of records; and
generating a user report specific to the human user based on said set of said records for said human user, wherein said report includes information on adherence to enterprise policies only by the human user associated with the enterprise wide user identity in conjunction with each of the objects corresponding to each of the set of records for the human user and excluding other human users of the enterprise from the report.

27. A method for involving a human user in object management, comprising:
enabling an administrator of an enterprise to define an enterprise wide user identity for the human user;
obtaining a set of user identities of the human user associated with a set of filesystems;
associating the enterprise wide user identity of the human user with the set of user identities of the human user, wherein each of the set of user identities of the human user is associated with one of the set of filesystems;
before or after the associating step, extracting data and metadata associated with objects from the set of filesystems, wherein the objects include files and directories and extracting the metadata comprises:
collecting raw metadata of the files and directories,
filtering the raw metadata,
synthesizing synthetic metadata from the filtered raw metadata, and
generating content-based metadata wherein generating content-based metadata for a file comprises processing content of the file according to a type of the file to determine one or more content-specific entities within the file;
storing the data and metadata in a metadata repository as records, each record linking a set of attributes to an associated object in one of the set of filesystems, wherein the set of attributes includes information identifying an owner of the object;
locating a set of records for the human user within the metadata repository using one or more of the set of user identities of the human user, wherein the human user is an owner of each of the objects corresponding to each of the set of records;
evaluating each of the objects to determine if each of the objects is in compliance with a set of enterprise policies, wherein each of the enterprise polices comprises a set of conditions for evaluating one or more of the set of attributes and evaluating the object comprises applying the set of conditions to the set of attributes linked to the object by the associated record; and
generating a report specific to the human user, wherein the report includes information on adherence to the set of enterprise policies by the human user associated with the enterprise wide user identity.

* * * * *